US008429681B2

(12) United States Patent
Hashimoto et al.

(10) Patent No.: US 8,429,681 B2
(45) Date of Patent: Apr. 23, 2013

(54) OPTICAL DISC APPARATUS WHICH INCLUDES AN OPTICAL PICKUP APPARATUS THAT INCLUDES AN OPTICAL MEMBER DRIVING APPARATUS

(75) Inventors: Mitsuhiro Hashimoto, Gunma (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 1265 days.

(21) Appl. No.: 12/205,081

(22) Filed: Sep. 5, 2008

(65) Prior Publication Data
US 2009/0070794 A1    Mar. 12, 2009

(30) Foreign Application Priority Data

Sep. 6, 2007  (JP) ................................. 2007-230951
Jun. 30, 2008  (JP) ................................. 2008-170051

(51) Int. Cl.
*G11B 33/02* (2006.01)
*G11B 7/00* (2006.01)

(52) U.S. Cl.
USPC ........................................ 720/661; 369/44.14

(58) Field of Classification Search .................. 720/659, 720/661, 658; 369/44.11, 44.12, 44.13, 112.23, 369/44.14; 359/696
See application file for complete search history.

(56) References Cited

U.S. PATENT DOCUMENTS

| 4,767,187 | A | * | 8/1988 | Gijzen et al. .................. 359/813 |
| 4,817,076 | A | * | 3/1989 | Van Sluys et al. ......... 369/44.21 |
| 4,845,699 | A | * | 7/1989 | Kawasaki et al. .......... 369/44.22 |
| 6,130,418 | A | * | 10/2000 | Van Rosmalen et al. .. 250/201.5 |
| 7,126,763 | B2 | * | 10/2006 | Sasaki ........................... 359/696 |
| 7,995,450 | B2 | * | 8/2011 | Ono et al. ................... 369/263.1 |
| 2006/0143637 | A1 | * | 6/2006 | Torii ............................. 720/660 |
| 2007/0019100 | A1 | * | 1/2007 | Mitani et al. ................. 348/335 |
| 2007/0206460 | A1 | * | 9/2007 | Ono et al. ................... 369/44.32 |
| 2009/0070794 | A1 | * | 3/2009 | Hashimoto et al. ........... 720/658 |
| 2009/0153981 | A1 | * | 6/2009 | Lee et al. ...................... 359/696 |

FOREIGN PATENT DOCUMENTS

| JP | 9-180257 | 7/1997 |
| JP | 11-259906 | 9/1999 |
| JP | 2006-302420 | 11/2006 |

* cited by examiner

*Primary Examiner* — Brian Miller
(74) *Attorney, Agent, or Firm* — Fish & Richardson P.C.

(57) ABSTRACT

An optical member driving apparatus comprising: a holding member configured to have an optical member mounted thereon; a driving unit assembly configured to be capable of driving the holding member; a connecting member configured to connect the holding member and the driving unit assembly; and a jointing member configured to joint the connecting member and either or both of the holding member and the driving unit assembly.

10 Claims, 2 Drawing Sheets

OPTICAL DISC APPARATUS WHICH INCLUDES AN OPTICAL PICKUP APPARATUS THAT INCLUDES AN OPTICAL MEMBER DRIVING APPARATUS

CROSS-REFERENCE TO RELATED APPLICATIONS

This application claims the benefit of priority to Japanese Patent Application Nos. 2007-230951 and 2008-170051, filed Sep. 6, 2007 and Jun. 30, 2008, respectively, of which full contents are incorporated herein by reference.

BACKGROUND OF THE INVENTION

1. Field of the Invention

The present invention relates to an optical member driving apparatus, an optical pickup apparatus including the optical member driving apparatus, and an optical disc apparatus including the optical pickup apparatus.

2. Description of the Related Art

There are introduced commercially large-capacity optical discs supporting a blue-violet laser beam/LASER (Light Amplification by Stimulated Emission of Radiation) such as a "Blu-ray Disc" (registered trademark) and an "HD DVD" (registered trademark) (High Definition DVD). As compared with the conventional optical discs such as a CD (Compact Disc) (registered trademark) and a DVD (registered trademark) (Digital Versatile Disc), the large-capacity optical discs such as the "Blu-ray Disc" and "HD DVD" have a remarkable feature, for example, that a high-density and multilayer technique has substantially been established and the high-densification and multilayer technique has been further improved.

Literature describing the multilayer discs includes, for example, a Japanese Patent Application Laid-Open Publication describing a large capacity optical disc that enables high-speed and stable recording, reproducing, and erasing of signals: without reducing storage capacity of the disc; and with reducing time for recording signals into a RAM unit for recording signals; and with eliminating the possibility of entrance of dust, etc., between layers of the RAM unit and a ROM unit (see, e.g., Japanese Patent Application Laid-Open Publication No. Hei9-180257 (p. 4 and FIGS. 1 to 10)).

"RAM" is the abbreviation of "Random Access Memory". "ROM" is the abbreviation of "Read Only Memory".

When a laser beam is applied to a multilayer optical disc, spherical aberration occurs to the laser beam spot formed by irradiation on a signal layer of the optical disc due to difference in thickness of a cover layer making up the optical disc, for example. "Aberration" means that a light beam having passed through a lens, for example is not correctly focused so that an incomplete image is formed. For example, the "spherical aberration" means a phenomenon that a light beam is not able to be focused on the optical axis.

literature describing a measure against the spherical aberration includes, for example, a Japanese Patent Application Laid-Open Publication describing an optical disc recording and reproducing method with which the spherical aberration due to the difference in thickness of the cover layer can be corrected even during recording of a recordable optical disc having one or a plurality of recording layers, and which an operation is not required for obtaining an optimum position to correct the spherical aberration every time an optical disc is mounted (see, e.g., Japanese Patent Application Laid-Open Publication No. 2006-302420 (pp. 1 and 3, and FIGS. 1 to 6)).

A common spherical aberration correction mechanism in an optical head apparatus, i.e., an optical pickup apparatus, includes a mechanism for driving a collimator lens, which converts a laser beam into a parallel light, a diffused light, or a convergent light, by using a motor such as a DC motor, for example.

Literature introducing the mechanism for driving a collimator lens using a motor such as a DC motor includes, for example, a Japanese Patent Application Laid-Open Publication describing: an optical head and a recording and/or reproducing apparatus capable of suppressing spherical aberration even if numerical aperture NA (Numerical Aperture) is increased; a recording and/or reproducing method capable of suppressing spherical aberration even if the numerical aperture NA is increased; and a thickness detection method capable of easily detecting the thickness of an optical transmission layer of an information recording medium having the optical transmission layer formed on its recording layer (see, e.g., Japanese Patent Application Laid-Open Publication No. Hei11-259906 (pp. 3 and 15, and FIGS. 12 and 13)).

A "numerical aperture" refers to the product of: a sine of an angle obtained when the effective radius of an objective lens (radius of entrance pupil) of an optical device, for example, is viewed from an object point; and refractive index of a medium on the incident side. A numerical aperture is used when describing performance of an objective lens, for example.

Some problems have been imposed on an optical pickup apparatus so that the optical pickup apparatus correctly and promptly correspond to a multilayer optical disc. One of the outstanding problems is, for example, how promptly the spherical aberration is corrected by an optical pickup apparatus, which aberration is generated between layers of an optical disc due to incorporation of multiple layers into the disc, when a laser beam is applied to a signal layer of the multilayer optical disc.

For example, in the case where a laser beam is applied to a signal layer of an optical disc by using an optical pickup apparatus including a motor and a collimator lens, when the motor is used to drive the collimator lens, vibration is always transmitted from the motor to the collimator lens during the operation of the motor. For example, even if a stop signal is sent to stop the motor, the collimator lens continues to vibrate and then stops after a small time lag, due to the influence of the vibration, etc., transmitted from the motor to the collimator lens. A problem has arisen that the optical pickup apparatus can stably read a signal recorded in the signal layer of the optical disc only after the collimator lens stops, i.e., a time period of, for example, about several tens msec (milliseconds) to 50 msec has elapsed, for example.

Concerns are rising that in the case where there is some wait until the collimator lens stops still, for example, when a multilayer optical disc is mounted in an optical disc apparatus including an optical pickup apparatus and a speedy game is being played with the apparatus, waiting time is often necessary while the game being played, so that it is difficult to play the speedy game smoothly.

For example, when a multilayer optical disc having software of a speedy game recorded thereon is mounted in an optical disc apparatus including an optical pickup apparatus and the game is played, there is frequently executed inter-layer jumping of the beam spot of a laser beam emitted from the optical pickup apparatus for signal layers of the optical disc. To support this, a necessity has arisen for a more speedup of aberration correction of the beam spot by the optical pickup apparatus for signal layers of the optical disc.

In order to increase the speed of the aberration correction of the beam spot of the optical pickup apparatus for signal layers of the multilayer optical disc, when the inter-layer jumping is frequently executed of the beam spot of the laser beam emitted from the optical pickup apparatus to signal layers of a multilayer optical disc, a proposal has been made that the collimator lens is driven at a higher speed by driving the motor at a higher speed, for example.

However, the fact is that, even if the collimator lens is driven at a high speed by driving the motor at a high speed, a certain waiting time is necessary until the vibration of the collimator lens caused by the vibration transmitted from the motor is reduced after the motor has stopped. As a result, the speedup of the aberration correction by the optical pickup apparatus for the multilayer optical disc is not realized.

When the collimator lens is forcibly driven at a high speed by forcibly driving the motor at a high speed, an irregular sound is generated while the collimator lens is being driven. It is also worried that a problem may arise to the durability of the optical pickup apparatus including driving members such as the motor and optical members such as the collimator lens due to high-speed driving of the motor, collimator lens, etc.

An optical member driving apparatus is desirable that includes an aberration correcting mechanism capable of promptly executing the aberration correction of the laser beam spot formed by irradiation on each signal layer of the multilayer optical disc even if the inter-layer jumping of the beam spot is frequently executed for signal layers of the optical disc, and an optical pickup apparatus including such an optical member driving apparatus is also desirable. An optical member driving apparatus with both of improved durability and improved reliability, and an optical pickup apparatus including the optical member driving apparatus with both of improved durability and improved reliability are also desirable.

SUMMARY OF THE INVENTION

An optical member driving apparatus according to an aspect of the present invention, comprises: a holding member configured to have an optical member mounted thereon; a driving unit assembly configured to be capable of driving the holding member; a connecting member configured to connect the holding member and the driving unit assembly; and a jointing member configured to joint the connecting member and either or both of the holding member and the driving unit assembly.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
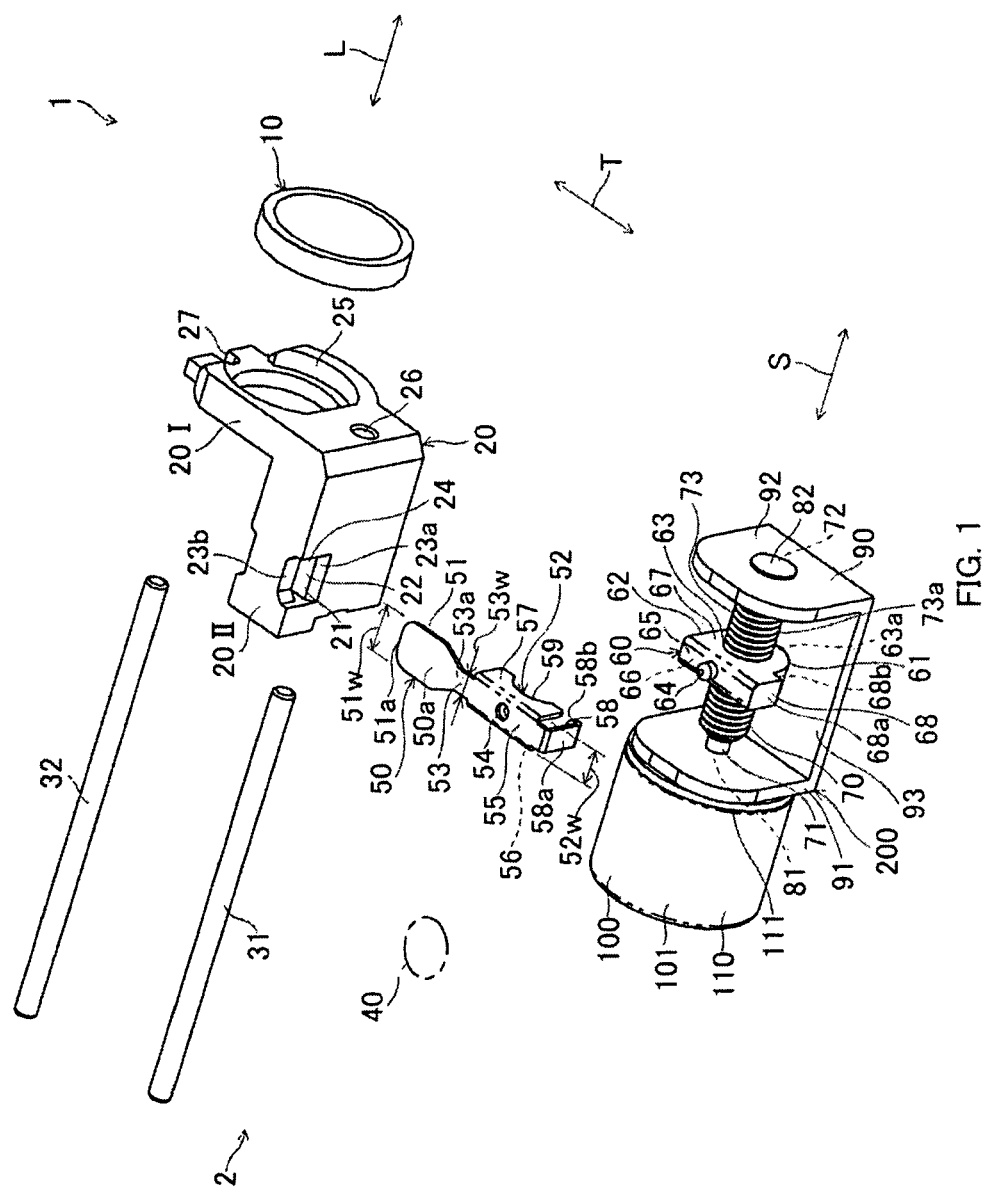
FIG. 1 is an exploded perspective view of an optical member driving apparatus according to a first embodiment of the present invention.

At least the following details will become apparent from descriptions of this specification and of the accompanying drawings.

An embodiment according to the present invention enables facilitation of avoidance of substantially direct transmission of the vibration of a driving unit assembly to a holding member including an optical member. A connecting member connects the holding member provided with the optical member and the driving unit assembly capable of driving the holding member. Therefore, while the driving unit assembly is driving or immediately after the driving unit assembly stops driving, the vibration transmitted from the driving unit assembly to the holding member including the optical member through the connecting member becomes apt to be attenuated by the connecting member to a certain degree. A jointing member joints the connecting member and either or both of the holding member including the optical member and the driving unit assembly. Therefore, while the driving unit assembly is driving or immediately after the driving unit assembly stops driving, the vibration transmitted from the driving unit assembly to the holding member including the optical member through the connecting member is apt to be substantially eliminated by the jointing member. Since the vibration transmitted to the holding member including the optical member is substantially eliminated, continuation of the vibration of the holding member including the optical member after the driving unit assembly stops is apt to be avoided. Since almost no vibration remains in the holding member including the optical member after the driving unit assembly stops, the aberration correction of the beam spot is apt to be promptly executed.

An embodiment according to the present invention enables facilitation of avoidance of substantially direct transmission of the vibration of the driving Unit assembly to the holding member including the optical member through the connecting member. While the driving unit assembly is driving or immediately after the driving unit assembly stops driving, the vibration transmitted from the driving unit assembly to the holding member including the optical member through the connecting member is attenuated to a certain degree by an intermediate portion connecting a first mounting portion corresponding to the holding member and a second mounting portion corresponding to the driving unit assembly.

An embodiment according to the present invention enables avoidance of substantially direct transmission of the vibration of the driving unit assembly to the holding member including the optical member through the connecting member. The width of the intermediate portion of the connecting member connecting the first mounting portion making up a connecting member corresponding to the holding member and the second mounting portion making up a connecting member corresponding to the driving unit assembly is set to be smaller than the width of the first mounting portion of the connecting member and the second mounting portion of the connecting member. Therefore, while the driving unit assembly is driving or immediately after the driving unit assembly stops driving, the vibration transmitted from the driving unit assembly to the holding member including the optical member through the connecting member is apt to be attenuated by the intermediate portion of the connecting member.

An embodiment according to the present invention enables facilitation of avoidance of substantially direct transmission of vibration generated from an electric motor of the driving unit assembly to the holding member including the optical member through a feed screw, a female screw, and the connecting member. While the electric motor of the driving unit assembly is driving or immediately after the electric motor thereof stops driving, the vibration generated from the electric motor of the driving unit assembly is transmitted to the feed screw and the female screw and, thereafter, the vibration is attenuated to a certain degree by a connecting member mounted on the female screw. While the electric motor of the driving unit assembly is driving or immediately after the electric motor thereof stops driving, the vibration generated from the electric motor of the driving unit assembly is transmitted to the feed screw, the female screw, and the connecting member and, thereafter, the vibration is substantially eliminated by the jointing member jointing the holding member including the optical member and the connecting member. Otherwise, while the electric motor of the driving unit assembly is driving or immediately after the electric motor thereof stops driving, the vibration generated from the electric motor of the driving unit assembly is transmitted to the feed screw and the female screw and, thereafter, the vibration is attenuated by the female screw making up the driving unit assembly and the jointing member jointing the connecting member.

An embodiment according to the present invention enables improvement of reliability of the optical member driving apparatus. When the connecting member is mounted on the female screw, an alignment portion provided on the female screw is aligned with a counterpart alignment portion provided on the connecting member. Therefore, even if the electric motor of the driving unit assembly is driven at a high speed and, with the assembly being driven, the holding member provided with the optical member is driven at a high speed through the feed screw coupled to the electric motor, the female screw meshed with the feed screw, and the connecting member mounted on the female screw, occurrence of a problem is avoided such as unprepared detachment of the counterpart alignment portion of the connecting member from the alignment portion of the female screw making up the driving unit assembly. The connecting member is securely mounted on the female screw by securely aligning the counterpart alignment portion provided on the connecting member with the alignment portion provided on the female screw.

An embodiment according to the present invention enables improvement of the reliability of the optical member driving apparatus. An engagement lock portion of the connecting member corresponding to an engaging portion of the female screw is engaged with the engaging portion of the female screw and, thus, the connecting member is mounted on the female screw making up the driving unit assembly. Therefore, even if the driving unit assembly drives at a high speed the holding member provided with the optical member through the connecting member, occurrence of a problem is avoided such as unprepared detachment of the engagement lock portion of the connecting member from the engaging portion of the female screw making up the driving unit assembly. The engagement lock portion of the connecting member corresponding to the engaging portion of the female screw is securely engaged with the engaging portion of the female screw and, thus, the connecting member is securely mounted on the female screw.

An embodiment according to the present invention enables improvement of the reliability of the optical member driving apparatus. A covering portion of the connecting member formed by executing a folding process for the connecting member in accordance with the female screw covers the female screw. Therefore, even if the driving unit assembly drives at a high speed the holding member provided with the optical member through the connecting member, occurrence of a problem is avoided such as unprepared detachment of the covering portion of the connecting member from the female screw making up the driving unit assembly. The connecting member is securely mounted on the female screw by securely covering the female screw with the covering portion formed on the connecting member by executing the folding process corresponding to the female screw.

An embodiment according to the present invention enables improvement of the reliability of the optical member driving apparatus. The connecting member is mounted on a fixing portion of the holding member corresponding to the connecting member. Therefore, even if the driving unit assembly drives at a high speed the holding member provided with the optical member through the connecting member, occurrence of a problem is avoided such as unprepared detachment of the connecting member from the fixing portion of the holding member including the optical member. The connecting member is securely mounted on the holding member by securely mounting the connecting member on the fixing portion of the holding member corresponding to the connecting member.

An embodiment according to the present invention enables facilitation of avoidance of remaining of the vibration in the holding member for a short time period after the driving unit assembly stops. An application facilitating portion that facilitates application of the jointing member onto the fixing portion of the holding member is provided on the fixing portion of the holding member. Therefore, a sufficient amount of the jointing member is applied onto the fixing portion of the holding member. When the connecting member is fixed to the holding member by using the jointing member after mounting the connecting member on the fixing portion provided on the holding member, occurrence of a problem is apt to be avoided such as that, for example, the application amount of the jointing member is insufficient and, due to this, the jointing member does not sufficiently absorb the vibration and, as a result, the vibration transmitted from the driving unit assembly to the holding member including the optical member through the connecting member is not sufficiently suppressed.

An embodiment according to the present invention facilitates substantial elimination of the vibration transmitted from the driving unit assembly to the holding member including the optical member through the connecting member by using the jointing member. The jointing member included in the fixing portion of the holding member properly absorbs the vibration generated from the driving unit assembly. Therefore, the vibration transmitted to the holding member including the optical member is substantially eliminated by the jointing member.

An embodiment according to the present invention enables facilitation of avoidance of remaining of the vibration in the holding member for a short time period after the driving unit assembly stops. While the driving unit assembly is driving or immediately after the driving unit assembly stops driving, the vibration transmitted from the driving unit assembly to the holding member including the optical member through the connecting member is securely attenuated by a metal plate spring member.

An embodiment according to the present invention enables avoidance of remaining of the vibration in the holding member for a short time period after the driving unit assembly stops. While the driving unit assembly is driving or immediately after the driving unit assembly stops driving, the vibration transmitted from the driving unit assembly to the holding member including the optical member through the connecting member is securely absorbed by a polymeric adhesive jointing the connecting member and either or both of the holding member including the optical member and the driving unit assembly.

An embodiment according to the present invention enables realization of an optical pickup apparatus capable of promptly executing inter-layer jumping of the beam spot formed by irradiation on each signal layer of the multilayer optical disc. In the case where a laser beam is applied to any one of the signal layers of the multilayer optical disc from the optical pickup apparatus, to form a beam spot on the one of the signal layers of the multilayer optical disc, even if the inter-layer jumping of the beam spot is frequently executed, the aberration correction of the beam spot formed by irradiation on each signal layer of the multilayer optical disc is apt to be promptly executed.

An embodiment according to the present invention enables realization of an optical disc apparatus capable of promptly executing inter-layer jumping of the beam spot formed by irradiation on each signal layer of the multilayer optical disc. In the case where a laser beam is applied to any one of the signal layers of the multilayer optical disc from the optical disc apparatus, to form a beam spot on the one of the signal layers of the multilayer optical disc, even if the inter-layer jumping of the beam spot is frequently executed, the aberration correction of the beam spot formed by irradiation on each signal layer of the multilayer optical disc is apt to be promptly executed.

Referring to the accompanying drawings, description will hereinafter be given in detail for an optical member driving apparatus, an optical pickup apparatus including the optical member driving apparatus, and an optical disc apparatus including the optical pickup apparatus according to an embodiment of the present invention.

Figure 2:
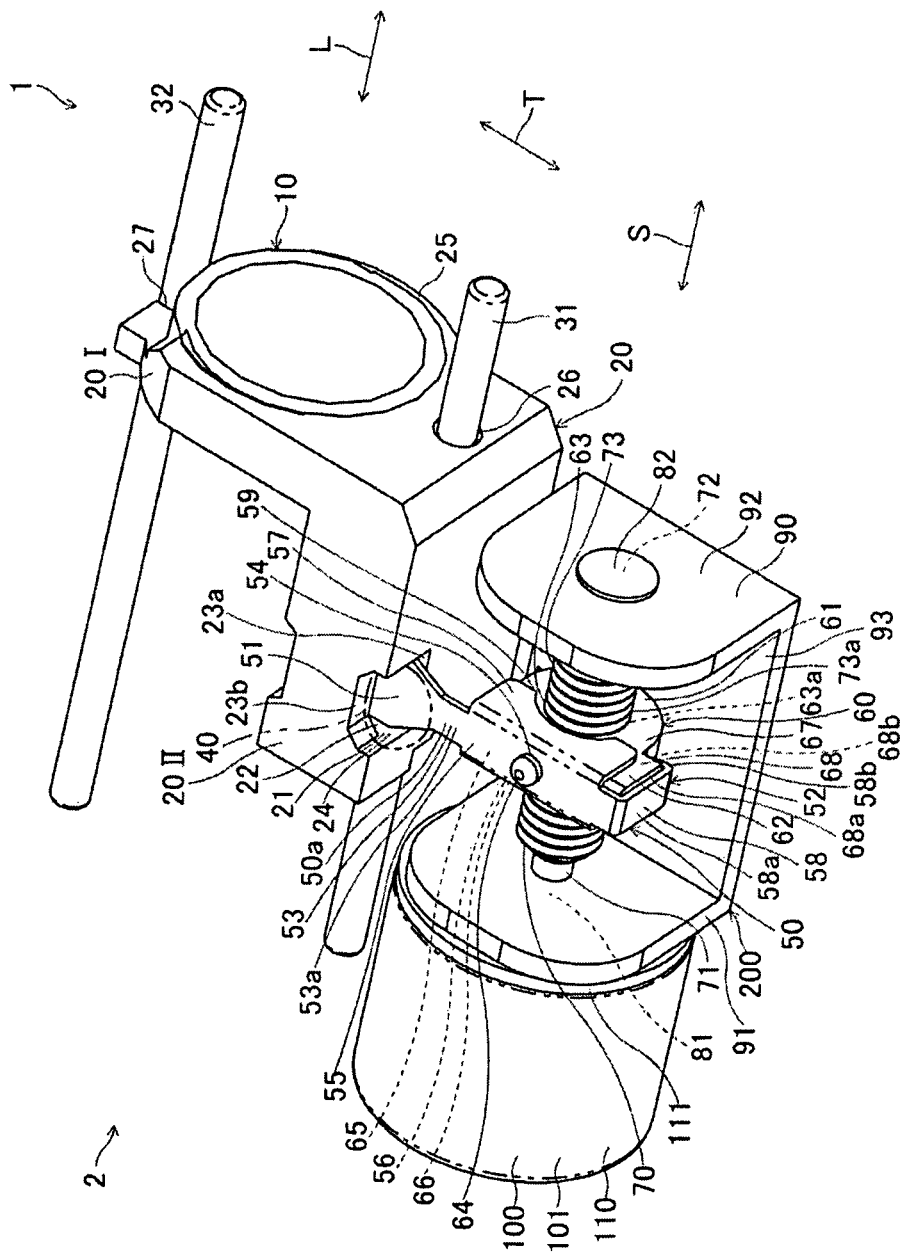
FIG. 2 is a perspective view of an optical member driving apparatus.

An optical member driving apparatus 1 shown in FIGS. 1 and 2 is depicted upside-down for convenience to facilitate the understanding of the description of the optical member driving apparatus 1. In practice, when thee optical member driving apparatus 1, the optical pickup apparatus (not shown) including the optical member driving apparatus 1, and the optical disc apparatus (not shown) including the optical pickup apparatus (not shown) are used, those apparatuses are mainly used in a upside-down state relative to the state shown in FIGS. 1 and 2, for example. When the optical member driving apparatus 1, the optical pickup apparatus not shown including the optical member driving apparatus 1, and the optical disc apparatus not shown including the optical pickup apparatus not shown are used, those apparatuses may be used, for example, in a substantially longitudinally-placed state (not shown.) For example, the direction L of a laser beam passing through an optical member 10 is assumed to be an optical axis direction L, the direction S in which a feed screw 70 is formed and extended is assumed to be a screw extending direction S, and the direction T in which an elastic member S is formed and extended is assumed to be an elastic member extending direction T. The definitions of "above", "under", "direction", etc., in this specification are definitions for convenience to describe the optical member driving apparatus 1, a mounting structure of a connecting member (elastic member) 50 of the optical member driving apparatus 1, the optical pickup apparatus including the optical member driving apparatus 1, and the optical disc apparatus including the optical pickup apparatus.

Each of various types of media such as various types of optical discs (not shown) is inserted in the optical disc apparatus including the optical pickup apparatus not shown having the optical member driving apparatus 1. "Media" means discs, etc., each having, e.g., data, information, and a signal, stored therein. Each of the various types of optical discs not shown to be inserted into the optical disc apparatus not shown is formed in a substantial disc shape. A disc can be, for example: an optical disc only for reading data such as a "CD-ROM", a "DVD-ROM", an "HD DVD-ROM", or a "BD-ROM"; a write-once read-many optical disc such as a "CD-R", a "DVD-R", a "DVD+R", an "HD DVD-R", or a "BD-R"; and an optical disc of a data-writable/erasable type or a data rewritable type such as a "CD-RW", a "DVD-RW", a "DVD+RW" (registered trademark), a "DVD-RAM", an "HD DVD-RW", an "HD DVD-RAM, or a "BD-RE".

The disc can also be, for example, an optical disc (not shown) that is provided with a signal face on each of the both sides of the disc and is data-writable/erasable or data-rewritable. The disc can also be, for example, an optical disc (not shown) that is provided with a two-layer signal face and is data writabile/erasable or data rewritable. The disc can also be, for example, an "HD DVD" optical disc (not shown) that is provided with a three-layer signal face and is data writable/erasable or data rewritable. The disc can also be, for example, a "Blu-ray Disc" optical disc (not shown) that is provided with a four-layer signal face and is data writable/erasable or data rewritable. The disc can also be, for example, an optical disc (not shown) capable of various types of writing on the optical disc such as writing onto a label, by applying a laser beam also to a label face of the disc. A signal layer of an optical disc is formed of, for example, a metal layer such as a metal thin film. Information and data are recorded on a signal layer formed of a metal thin film, etc.

The optical disc apparatus is compatible with, for example, the above various types of discs. Reproduction of data such as information recorded in various types of optical discs is executed by using the optical disc apparatus. Recording of data such as information is executed for the above various types of discs by using the optical disc apparatus.

For the optical disc capable of recording therein information such as data in the optical disc apparatus, a groove (not shown) to have data/information stored thereon is provided on a signal layer of the optical disc. A groove means an elongated depression. When a circular-plate-shaped optical disc is viewed in a plan view, the groove is formed in a substantial spiral shape. In the case where a laser beam is applied to the optical disc, when the optical disc is viewed from a signal layer to which the laser beam is applied, the groove is in a spiral shape. Since the groove is very fine, it is not visually observable.

Description will be given for an optical disc. "CD" is the abbreviation of "Compact Disc" (registered trademarks). "DVD" is the abbreviation of "Digital versatile Disc". "ROM" in "CD-ROM", "DVD-ROM", and "HD DVD-ROM" is the abbreviation of "Read Only Memory". "BD-ROM" is the abbreviation of "Blu-ray Disc-ROM". The "CD-ROM", the "DVD-ROM", the "HD DVD-ROM", and the "BD-ROM" are only for reading of data/information. "R" in "CD-R", "DVD-R", "DVD+R", and "HD DVD-R" is the abbreviation of "Recordable". "BD-R" is the abbreviation of "Blu-ray Disc-R". The "CD-R", the "DVD-R", the "DVD+R", the "HD DVD-R", and the "BD-R" are data/information writable. "RW" in "CD=RW", "DVD-RW", "DVD+RW", and "HD DVD-RW" is the abbreviation of "Re-Writable". "BD-RE" is the abbreviation of "Blu-ray Disc-RW". The "CD-RW", the "DVD-RW", the DVD+RW", the "HD DVD-RW" and the "BD-RE" are data/information rewritable. "RAM" of "DVD-RAM" and "HD DVD-RAM" is the abbreviation of "Random Access Memory" The "DVD-RAM" and the "HD DVD-RAM" are data/information readable and writable/erasable.

"HD DVD" (registered trademarks) is the abbreviation of "High Definition DVD". The "HD DVD" is compatible with those in the conventional DVD series and has a larger storage capacity than that of a disc in the conventional DVD series. An infrared laser beam is used for a conventional CD. A red laser beam is used for a conventional DVD. On the other hand, when data/information/signals recorded in an optical disc of "HD DVD" is read or when data/information/signals is written into an optical disc of "HD DVD", a blue-violet laser beam is used. "Blu-ray" means a blue-violet laser beam employed to realize high density recording as opposed to the red laser beam used to read and write a conventional signal.

As shown in FIGS. 1 and 2, the optical member driving apparatus 1 includes: the optical member 10 through which a laser beam (not shown) passes when the laser beam is applied to any one of signal layers of a multilayer optical disc (not shown) to form a beam spot on the one of the signal layers of the multilayered optical disc; a holding member 20 having the optical member 10 mounted thereon; a pair of supporting members 31, 32 that are formed extending substantially in the optical axis direction L of the optical member 10 and that support the holding member 20 such that the holding member 20 can reciprocally move substantially in the optical axis L of the optical member 10; a driving unit assembly 200 that enables the holding member 20 having the optical member 10 mounted thereon to repeatedly reciprocally move substantially in the longitudinal direction (optical axis direction) L of the supporting members 31, 32; the connecting member 50 connecting the holding member 20 and a female screw 60 of the driving unit assembly 200; a jointing member 40 (FIG. 2) jointing the connecting member 50 and either or both of the holding member 20 and a female screw 60 making up the driving unit assembly 200; and a mounting frame member (not shown) on which the pair of supporting members 31, 32 (FIGS. 1 and 2) and the driving unit assembly 200 are mounted.

The optical member driving apparatus 1 makes up, for example, an expander unit 2 that is necessary when the laser beam is applied to any one of signal layers of a multilayer optical disc to form a beam spot on the one of the signal layers of the multilayer optical disc. The expander unit 2 in this specification is, for example, a movable expander unit that varies the size of the laser beam to a necessary size. For example, the holding member 20 provided with the lens-shaped optical member 10 is moved substantially in the optical axis direction L of the lens-shaped optical member 10 by using a small-sized electric motor 100 so that the size of the laser beam spot formed by irradiation on each signal layer of the optical disc is varied to the necessary size. For example, when recording of data/information/ signals is executed for an optical disc including a plurality of signal layers such as the "Blu-ray Disc"/"HD DVD"/"DVD" standard optical disc, the beam expander unit 2 including the movable lens-shaped optical member 10 is needed by the optical pickup apparatus and the optical disc apparatus including the optical pickup apparatus, etc. In the case where data/information/signals recorded in an optical disc including a plurality of signal layers such as the "Blu-ray Disc"/"HD DVD"/"DVD" standard optical disc is reproduced, if the beam expander unit 2 including the movable lens-shaped optical member 10 is included in the optical pickup apparatus and the optical disc apparatus including the optical pickup apparatus, etc., a high-precision laser beam spot can be formed by irradiation on each signal layer of the optical disc.

For example, even if the heat generated by the optical pickup apparatus and the optical disc apparatus including the optical pickup apparatus, etc., changes the characteristics of various parts such as the lens-shaped optical member 10, etc., included in the optical pickup apparatus and the optical disc apparatus including the optical pickup apparatus, etc., a high-precision laser beam spot is formed by irradiation on each signal layer of the optical disc by moving to adjust the position of the lens-shaped optical member 10 of the beam expander unit 2 substantially in the optical axis direction L of the lens-shaped optical member 10.

As the optical member 10, there are used one convex lens 10 that serves as a beam expander lens enabling the adjustment of the position of a laser beam spot formed by irradiation on each signal layer of a multilayer optical disc, and also serves as a collimator lens converting a laser beam into a parallel light, a diffused light, or a convergent light. For convenience, the lens to is in this specification referred to as a collimator lens 10, for example.

As the holding member 20, there is used a substantially L-shaped lens holder 20 capable of being provided with the optical member 10 such as the lens 10 and the connecting member 50 such as the plate spring member 50. The substantially L-shaped holding member 20 includes a substantially plate-shaped first side wall portion 20I provided with the substantially circular-plate-shaped optical member 10, and a substantially plate-shaped second side wall portion 20II provided with the deformed connecting member 50. While the substantially plate-shaped first side wall portion 20I is formed substantially in the direction (elastic member extending direction) T that is substantially perpendicular to the optical axis direction L, the substantially plate-shaped second side wall portion 20II extending from the first side wall portion 20I is formed substantially in the direction T that is substantially perpendicular to the first side wall portion 20I, and the portion 20II is formed extending substantially in the optical axis direction L. The substantially circular-plate-shaped and substantially curved-surfaced convex lens 10 is mounted on the substantially circular-hole-shaped lens mounted portion 25 substantially in the center of the substantially plate-shaped side wall portion 20I making up the lens holder 20 such that the lens 10 is inserted into the mounted portion 25.

As the supporting members 31, 32, there are used substantially round-bar-shaped sliding shafts 31, 32 which the lens holder 20 can contact so as to slide smoothly. A substantially circular-hole-shaped first sliding contact portion 26 of the lens holder 20 is provided with the substantially straight-round-bar-shaped first sliding shaft 31, so as to slidably contact the shaft 31. A substantially U-shaped second sliding contact portion 27 of the lens holder 20 is provided with the substantially straight-round-bar-shaped second sliding shaft 32, so as to be able to slidingly contact the shaft 32. The lens holder 20 including the lens 10 is movably supported by the two sliding shafts 31, 32 that are substantially parallel to the optical axis (not shown) of the laser beam passing through the substantially curved-surfaced convex lens 10.

As the driving unit assembly 200, there is used a motor assembly 200 that generates the driving force and that is capable of transmitting the driving force. As the connecting member 50, there is used the deformed plate spring member 50 that facilitates the attenuation of the vibration. As the jointing member 40, there is used an adhesive that is apt to absorb the vibration and that is capable of point adhesion. As the mounting frame member not shown, there is used a housing on which the various members, etc., are mounted. As the optical member driving apparatus 1, there is used a lens driving apparatus 1 that reciprocally moves the lens 10. The motor assembly 200 is referred to as, for example, "Assy Stepping motor", etc. "Housing" means a box-shaped housing or something similar to a box that accommodates items such as, for example, apparatuses and parts.

The lens holder 20 including the collimator lens 10 is moved substantially in the optical axis direction L by driving the small-sized electric motor 100 of the motor assembly 200. For example, when inter-layer jumping of the laser beam spot formed by irradiation on each signal layer of a multilayer optical disc is executed, the small-sized electric motor 100 of the motor assembly 200 is driven to move the lens holder 20 including the collimator lens 10 substantially in the optical axis direction L, and thus, the inter-layer jumping of the beam spot is executed from a first signal layer (not shown) to a second signal layer (not shown) of the multilayer optical disc, for example. By moving the lens holder 20 including the collimator lens 10 substantially in the optical axis direction L, the spherical aberration of the laser beam spot is corrected which is caused by the difference of the thickness of the cover layer making up each optical disc, for example. Thereby, the lens driving apparatus 1 or the optical pickup apparatus not shown including the lens driving apparatus 1 becomes effectively compatible with multilayer optical discs such as the optical discs of the "Blu-ray Disc" standard and the optical discs of the "HD DVD" standard.

If the lens driving apparatus 1 shown in FIGS. 1 and 2 is configured, the substantially direct transmission of the vibration of the motor assembly 200 to the lens holder 20 including the collimator lens 10 is apt to be avoided. The spring member 50 connects the lens holder 20 having the collimator lens 10 mounted thereon and the female screw 60 of the motor assembly 200 capable of repeatedly and reciprocally driving at a high speed the lens holder 20 having the collimator lens 10 mounted thereon substantially in the longitudinal direction L of the sliding shafts 31, 32. Therefore, while the motor assembly 200 is driving or immediately after the motor assembly 200 stops driving, the vibration transmitted from the female screw 60 of the motor assembly 200 to the lens holder 20 including the collimator lens 10 through the spring member 50 is apt to be attenuated by the spring member 50 to a certain degree.

An adhesive 40 joints the spring member 50 and either or both of the lens holder 20 including the collimator lens 10 and the female screw 60 making up the motor assembly 200. Therefore, while the motor assembly 200 is driving or immediately after the motor assembly 200 stops driving, the vibration transmitted from the female screw 60 of the motor assembly 200 to the lens holder 20 including the collimator lens 10 through the spring member 50 is substantially eliminated by the adhesive 40.

For example, at least, the adhesive 40 joints the spring member 50 and the lens holder 20 including the collimator lens 10 and, therefore, while the motor assembly 200 is driving or immediately after the motor assembly 200 stops driving, the vibration transmitted from the female screw 60 of the motor assembly 200 to the lens holder 20 including the collimator lens 10 through the spring member 50 is substantially eliminated by the adhesive 40.

Depending on the design/specification of the lens driving apparatus 1 and the optical pickup apparatus including the lens driving apparatus 1, for example, the adhesive (40) may joint the female screw 60 of the motor assembly 200 and the spring member 50. In this case, for example, the adhesive (40) is made to intervene between a reference plane portion 65 of the female screw 60 and a substrate portion 55 of the spring member 50. The parentheses "( )" attached to the reference numerals in this specification are used for convenience to describe the components that are somewhat different from those shown in the accompanying drawings. The adhesive (40) joints the female screw 60 of the motor assembly 200 and the spring member 50, and thus, while the motor assembly 200 is driving or immediately after the motor assembly 200 stops driving, the vibration transmitted from the motor assembly 200 to the lens holder 20 including the collimator lens 10 through the spring member 50 is substantially eliminated by the adhesive 40.

Depending on the design/specification of the lens driving apparatus 1 and the optical pickup apparatus including the lens driving apparatus 1, for example, the adhesive 40 joints the lens holder 20 including the collimator lens 10 and the spring member 50 and, in addition, the adhesive (40) joints the female screw 60 of the motor assembly 200 and the spring member 50. Thereby, while the motor assembly 200 is driving or immediately after the motor assembly 200 stops driving, the vibration transmitted from the female screw 60 of the motor assembly 200 to the lens holder 20 including the collimator lens 10 through the spring member 50 is substantially eliminated by the adhesive 40, (40).

Since the vibration transmitted to the lens holder 20 including the collimator lens 10 is substantially eliminated, there is facilitated avoidance of the vibration of the lens holder 20 including the collimator lens 10 remaining for a short time period after the motor 100 of the motor assembly stops. Almost no vibration remains in the lens holder 20 including the collimator lens 10 after the motor 100 of the motor assembly 200 stops. Therefore, in the case where a laser beam is applied on any one of signal layers of a multilayer optical disc to form a beam spot on the one of the signal layers of the multilayer optical disc, even if the inter-layer jumping of the beam spot is frequently executed, spherical aberration correction of the laser beam spot formed by irradiation on each signal layer of the multilayer optical disc is apt to be promptly executed.

Since the spherical aberration correction of the laser beam spot formed by irradiation on each signal layer of the multilayer optical disc is promptly executed, even if the optical pickup apparatus including the lens driving apparatus 1 executes the inter-layer jumping of the beam spot from the first signal layer to the second signal layer of the multilayer optical disc not shown, for example, the inter-layer jumping of the beam spot is executed in a short time period longer than substantially 0 msec (millisecond) and shorter than 100 msec and, preferably, longer than substantially 0 msec and shorter than 80 msec.

For example, in the case where a multilayer optical disc having software of a speedy game recorded therein is mounted on the optical disc apparatus including the optical pickup apparatus and the game is played, even if the inter-layer jumping of the beam spot of the laser beam emitted from the optical pickup apparatus to each signal layer of the optical disc is frequently executed, playing of the speedy game is not interrupted and the speedy game is played smoothly.

To support a multilayer optical disc having software of a speedy game recorded therein, the time period required for the inter-layer jumping of the beam spot formed by irradiation on each signal layer of the multilayer optical disc is ideally made as close to substantially zero msec as possible, for example. In the case where the time period required for the inter-layer jumping of the beam spot formed by irradiation on each signal layer of the multilayer optical disc is set to be equal to or less than 100 msec, even if the inter-layer jumping of the beam spot is frequently executed, the speedy game is apt to be smoothly played. More specifically describing, Since the time period required for the inter-layer jumping of the laser beam spot formed by irradiation on each signal layer of the multilayer optical disc is set to be equal to or less than 80 msec and, even if the inter-layer jumping of the beam spot is frequently executed, the playing of the speedy game is not interrupted and the speedy game is smoothly played. The speedy game can be, for example, a fighting sport game or a racing car game.

The adhesive 40 joints the spring member 50 and either or both of the lens holder 20 including the collimator lens 10 and the female screw 60 making up the motor assembly 200 and, therefore, occurrence of a problem is avoided such as unprepared detachment of the spring member 50 from the lens holder 20 including the collimator lens 10 or unprepared detachment of the spring member 50 from the female screw 60 making up the motor assembly 200 is avoided even if the lens holder 20 having the collimator lens 10 mounted thereon is repeatedly and reciprocally driven to move at a high speed substantially in the optical axis direction L of the collimator lens 10 by the motor assembly 200 through the spring member 50.

The female screw 60 making up the motor assembly 200 includes: a substantially rectangular-piece-shaped substantially upper half portion 62 that substantially corresponds to a substantially rectangular-frame-shaped covering portion 52 making up the spring member 50; and a substantially semi-circular-plate-shaped substantially lower half portion 61 that is opposite to the substantially rectangular-piece-shaped substantially upper half portion 62, to be formed in a substantially plate-shaped substantially deformed screw shape.

The spring member 50 that joints the lens holder 20 including the collimator lens 10 and the female screw 60 making up the motor assembly 200 includes a substantially tongue-shaped first mounting portion 51 corresponding to a substantially rectangular-through-hole-shaped connection fixing portion 21 of the lens holder 20, a substantially rectangular-frame-shaped second mounting portion (covering portion) 52 corresponding to the substantially substantially rectangular-piece-shaped substantially upper half portion 62 of the female screw 60 making up the motor assembly 200, and a substantially plate-shaped intermediate portion connecting the first mounting portion 51 and the second mounting portion 52.

Therefore, substantially direct transmission of the vibration of the motor assembly 200 to the lens holder 20 including the collimator lens 10 through the spring member 50 is apt to be avoided. While the motor assembly 200 is driving or immediately after the motor assembly 200 stops driving, the vibration transmitted from the motor assembly 200 to the lens holder 20 including the collimator lens 10 through the spring member 50 is attenuated to a certain degree by the substantially plate-shaped intermediate portion 53 that connects the substantially tongue-shaped first mounting portion 51 corresponding to the substantially rectangular-through-hole-shaped connection fixing portion 21 of the lens holder 20 and the substantially rectangular-frame-shaped second mounting portion 52 corresponding to the substantially rectangular-piece-shaped substantially upper half portion 62 of the female screw 60 making up the motor assembly 200.

The substantially tongue-shaped first mounting portion 51 making up the spring member 50 is formed extending substantially in the direction T that is substantially perpendicular to the optical axis direction L, and the substantially rectangular-frame-shaped second mounting portion 52 making up the spring member 50 is formed extending substantially in the direction T that is substantially perpendicular to the optical axis L. The substantially rectangular-plate-shaped intermediate portion 53 joints the first mounting portion 51 and the second mounting portion 52 of the spring member 50. The spring member 50 including the first mounting portion 51, the second mounting portion 52, and the intermediate portion 53 is formed extending substantially in the spring member extending direction T that is substantially perpendicular to the optical direction L. A substantially plate-spring-shaped flat plate portion 50a including the substantially tongue-shaped first mounting portion 51 and the substantially rectangular-plate-shaped intermediate portion 53 is coupled substantially in a flat plate shape, for example, to the substantially flat-plate-shaped substrate portion 55 of the substantially rectangular-frame-shaped second mounting portion 52. A narrow-width neck portion 53a is formed between the substantially tongue-shaped first mounting portion 51 and the substantially rectangular-frame-shaped second mounting portion 52 of the spring member 50.

More specifically describing, as in FIG. 1, a width 53w substantially in the optical axis direction L or the screw extending direction S of the intermediate portion 53 making up the spring member 50 is set to be narrower than each of a width 51w substantially in the optical axis direction L or the screw extending direction S of the substantially tongue-shaped first mounting portion 51 making up the spring member 50 and a width 52w substantially in the optical axis direction L or the screw extending direction S of the substantially rectangular-frame-shaped second mounting portion 52 making up the spring member 50. The narrow-width intermediate portion 53 is made up in the spring member 50 (FIG. 1, FIG. 2) so that the spring member 50 is formed in a pinched substantially neck shape.

Therefore, the substantially direct transmission of the vibration is avoided of the female screw 60 making up the motor assembly 200 to the lens holder 20 including the collimator lens 10 through the spring member 50. The width 53w substantially in the optical axis direction L or the screw extending direction S of the substantially plate-shaped intermediate portion 53 of the spring member 50, which connects the substantially tongue-shaped first mounting portion 51 making up the spring member 50 corresponding to the lens holder 20 and the substantially rectangular-frame-shaped second mounting portion 52 making up the spring member 50 corresponding to the motor assembly 200, is set to be narrower than each of the width 51w substantially in the optical axis direction L or the screw extending direction S of the first mounting portion 51 of the spring member 50 and the width 52w substantially in the optical axis direction L or the screw extending direction S of the second mounting portion 52 of the spring member 50. Therefore, while the motor assembly 200 is driving or immediately after the motor assembly 200 stops driving, the vibration transmitted from the motor assembly 200 to the lens holder 20 including the collimator lens 10 through the spring member 50 is apt to be attenuated by the substantially plate-shaped intermediate portion 53 of the substantially neck shape spring member.

The substantially tongue-shaped first mounting portion 51 making up the spring member 50 is, for example, a substantially deformed-plate-shaped tongue-shaped portion 51. The substantially rectangular-frame-shaped second mounting portion 52 making up the spring member 50 is, for example, a substantially rectangular-frame-shaped covering portion 52. The substantially rectangular-flat-plate-shaped intermediate portion 53 that connects the substantially tongue-shaped first mounting portion 51 and the substantially rectangular-frame-shaped second mounting portion 52, is a substantially rectangular-flat-plate-shaped linking portion 53 (intermediate portion), for example.

The motor assembly 200, which generates a rotary driving force and converts the rotary driving force into a reciprocating linear driving force in the screw extending direction S or the optical axis direction L to be transmitted to the connecting member 50, has: the small-sized electric motor 100 that generates the rotary driving force; the feed screw 70 that transmits the rotary driving force of the small-sized electric motor 100; the female screw 60 that, by screwing with the feed screw 70, converts the rotary driving force into the reciprocating linear driving force substantially in the screw extending direction S and the optical axis direction L and transmits the reciprocal linear driving force substantially in the screw extending direction S and the optical axis direction L; a pair of sliding bearings 81, 82 that supports the feed screw 70 such that the feed screw is rotatable; and a mounting base 90 that supports the pair of sliding bearings 81, 82, the feed screw 70 supported by the pair of sliding bearings 81, 82 such that the feed screw 70 is rotatable, and the small-sized electric motor 100 coupled to the feed screw 70. The covering portion 52 of the connecting member 50 is mounted on the substantially upper half portion 62 of the female screw 60.

As the small-sized electric motor 100, there is used a small-sized stepwise-driving electric motor 100, a so-called small-sized stepping motor 100 that becomes capable of normal rotation driving or reverse rotation driving and that becomes capable of fine-angle driving, by being energized. A stepping motor means a motor that rotates by being input with, for example, a pulse signal. More specifically describing, a stepping motor is a motor that can be directly controlled with a pulse signal and is also a motor that rotates by a certain angle every time a pulse signal is input thereto. Therefore, a stepping motor is considered to be a motor capable of high precision positioning. The stepping motor 100 shown in FIGS. 1 and 2 is, for example, a motor 100 that allows positioning control to be facilitated and is a motor 100 that is suitable when a fine feed action, etc., are executed. Although the stepping motor 100 capable of high precision positioning is used as the motor 100 as above, motors other than the stepping motor 100 may be used.

As the small-sized stepping motor 100, in addition to a lead-screw small-sized stepping motor 100, there may be used a small-sized stepping motor 100 in the form of a cylinder type, a plane type (flat type), a built-in type, a stack type, or linear line type (linear type motor), for example.

As the small-sized stepping motor 100, there may be used small-sized stepping motor 100 of the type such as a permanent magnet type (PM type), a variable reluctance type (VR type), or a permanent magnet/variable reluctance hybrid type (HB type), for example.

As the small-sized stepping motor 100, there may be used a small-sized stepping motor 100 that is a two-phase motor, a three-phase motor, a four-phase motor, a five-phase motor, or a multi-phase motor, for example. The two-phase motor can be a one-phase excitation motor, a two-phase excitation motor, or a one-two-phase excitation motor, for example. The four-phase motor can be a four-phase magnetic-excitation motor, a W-one-two-phase excitation motor, or a three-four-phase excitation motor, for example. The five-phase motor can be a five-phase standard-connection (four-phase excitation, four-five-phase excitation) motor, a pentagon connection (four-phase excitation) motor, or a star connection (two-three-phase excitation) motor, for example.

As the stepping motor 100, a bipolar-energizing-method mono-filer-wound stepping motor 100 may be used, for example. The bipolar-energizing method means a method of passing a driving current in each of the both directions of a coil, for example. As the stepping motor 100, a unipolar-energizing-method bi-filer-wound stepping motor 100 may be used, for example. The unipolar-energizing method means a method of passing a driving current in one direction of a coil, for example.

The driving method of driving the small-sized stepping motor 100 can be a microstep driving method (an analog type, a digital type), an open-loop control method (a closed-loop control method), a constant-voltage driving method (an external resistance method), a constant-current driving method (a chopper control method), a voltage switching method (a high-voltage, a low-voltage two-power-source switching method), or a reverse phase pulse application driving method (a positive-cast control method), for example.

As the feed screw 70, substantially bar-shaped lead screw 70 including a high precision spiral groove portion 73*a* formed on a screw main body 73 is used. The substantially bar-shaped feed screw 70, that is, the lead screw 70 is formed extending substantially in a direction L that is substantially same as the optical axis direction L or the screw extending direction S that is S. As the female screw 60, there is used a screw nut 60 including a spiral groove portion 63*a*, which is formed in the screw hole portion 63, corresponding to the spiral groove portion 73*a* of the screw main body 73 of the lead screw 70. When the screw main body 73 of the lead screw 70 is placed through a nut hole portion 63 of the screw nut 60 and the lead screw 70 is screwed in the normal or reverse direction, the lead screw 70 reciprocally moves as the screw groove portion 63*a* of the nut hole portion 63 of the screw nut 60 engaged with a screw thread 73*a* of the screw main body 73 of the lead screw 70 is caused to slidingly contact the screw thread 73*a*, with the normal or the reverse screwing of the lead screw 70. Thus, the screw nut 60 reciprocally moves substantially in the lead direction (screw extending direction) S of the substantially bar-shaped lead screw 70.

As the sliding bearings 81, 82, ultra-small-sized plane bearings 81, 82 each formed with a high precision slidingly contact surface are used. Each of the bearings 81, 82 serves as radial bearings 81, 82 and/or thrust bearings 81, 82, for example. In stead of the ultra-small-sized sliding bearings 81, 82, ultra-small-sized rolling bearings (81, 82), that is, so-called miniature ball bearings (81, 82) may be used, for example.

As the mounting base 90, there is used a substantially U-shaped bracket 90 formed by forming a substantially plate-shaped metal material, etc., by using high-precision pressing such as stamping, folding, etc. The bracket 90 includes a left-side substantially flat-plate-shaped first side plate portion 91 provided with a first bearing (sliding bearing) 81, a right-side substantially flat-plate-shaped second side plate portion 92 provided with a second bearing (sliding bearing) 82 equipped therein, a lower-side substantially flat-plate-shaped substrate portion 93 that joints the first side plate portion 91 and the second side plate portion 92. The second side plate portion 92 is formed substantially parallel to the first side plate portion 91. The substrate portion 93 is formed substantially in the direction substantially perpendicular to the first side plate portion 91 and the second side plate portion 92. A first end 71 of the lead screw 70 is rotatably mounted on the first bearing 81 mounted on the first side plate portion 91 of the substantially U-shaped bracket 90. The first end 71 of the lead screw 70 extends into a substantially cylinder-shaped motor main body 101 making up the stepping motor 100. A second end 72 of the lead screw 70 is rotatably mounted on the second bearing 82 mounted on the second side plate portion 92 of the substantially U-shaped bracket 90. A substantially circular-plate-shaped end portion 111 of a substantially cylinder-shaped housing 110, that is, a so-called case 110 of the stepping motor 100 is mounted externally onto the substantially flat-plate-shaped first side plate portion 91 of the substantially U-shaped bracket 90, and thus, the stepping motor 100 is mounted on the bracket 90.

As the motor assembly 200, there is used lead-screw-type stepping motor assembly 200 including the stepping motor 100, the lead screw 70, the screw nut 60, the plane bearings 81, 82, and the bracket 90.

When the lead-screw-type stepping motor assembly 200 shown in FIGS. 1 and 2 is made up, there is apt to be avoided direct transmission of the vibration generated from the stepping motor 100 of the motor assembly 200 to the lens holder 20 including the collimator lens 10 through the lead screw 70 of the motor assembly 200, the screw nut 60 of the motor assembly 200, and the spring member 50.

While the stepping motor 100 of the motor assembly 200 is driving or immediately after the stepping motor 100 stops driving, the vibration generated from the stepping motor 100 of the motor assembly 200 is transmitted to the lead screw 70 and the screw nut 60 of the motor assembly 200 and, thereafter, the vibration is attenuated to a certain degree by the intermediate portion 53 of the spring member 50 mounted on the substantially upper half portion 62 of the screw nut 60.

While the stepping motor 100 of the motor assembly 200 is driving or immediately after the stepping motor 100 stops driving, the vibration generated from the stepping motor 100 of the motor assembly 200 is transmitted to the lead screw 70 of the motor assembly 200, the screw nut 60 of the motor assembly 200, and the spring member 50 and, thereafter, the vibration is attenuated or substantially eliminated by the synthetic polymeric adhesive 40 that joints the spring member 50 and either or both of the lens holder 20 including the collimator lens 10 and the screw nut 60 making up the motor assembly 200.

More specifically describing, while the stepping motor 100 of the motor assembly 200 is driving or immediately after the stepping motor 100 stops driving, the vibration generated from the stepping motor 100 of the motor assembly 200 is transmitted to the lead screw 70 of the motor assembly 200, the screw nut 60 of the motor assembly 200, and the spring member 50 and, thereafter, the vibration is substantially eliminated by the synthetic polymeric adhesive 40 that joints the lens holder 20 including the collimator lens 10 and spring member 50.

Otherwise, while the stepping motor 100 of the motor assembly 200 is driving or immediately after the stepping motor 100 stops driving, the vibration generated from the stepping motor 100 of the motor assembly 200 is transmitted to the lead screw 70 of the motor assembly 200 and the screw nut 60 of the motor assembly 200, and thereafter, the vibration is attenuated by the synthetic polymeric adhesive not shown that joints the screw nut 60 making up the motor assembly 200 and the spring member 50.

An alignment portion 64 that is engaged when the spring member 50 is mounted on the screw nut 60 is provided on the screw nut 60. A counterpart alignment portion 54 corresponding to the alignment portion 64 is provided on the spring member 50. More specifically describing, a substantially columnar or substantially circular-plate-shaped alignment protrusion (alignment portion) 64 that engages when the covering portion 52 of the spring member 50 is mounted on the substantially upper half portion 62 of the screw nut 60, is formed protruding substantially in the center of the upper side, i.e., substantially in the center of the reference plane portion 65 of the substantially upper half portion 62 of the screw nut 60. A substantially circular-hole-shaped alignment hole portion 54 corresponding to the alignment protrusion 64 of the screw nut 60, is bored substantially in the center of the upper side, i.e., substantially in the center of the substrate portion 55 of the covering portion 52 of the spring member 50.

When the mounting structure of the spring member 50 of the lens driving apparatus 1 shown in FIGS. 1 and 2 is made up, the reliability of the lens driving apparatus 1 is improved. When the covering portion 52 of the spring member 50 is mounted on the substantially upper half portion 62 of the screw nut 60, the substantially circular-hole-shaped alignment hole portion 54, which is bored substantially in the center of the upper side, i.e., substantially in the center of the substrate portion 55 of the covering portion 52 of the spring member 50, is engaged with the alignment protrusion 64, which is formed protruding substantially in the center of the upper side, i.e., substantially in the center of the reference plane portion 65 of the substantially upper half portion 62 of the screw nut 60. Therefore, even if the stepping motor 100 of the motor assembly 200 is driven at a high speed, and with the motor being driven, the lens holder 20 having the collimator lens 10 mounted thereon is repeatedly and reciprocally driven at a high speed substantially in the optical axis direction L of the collimator lens 10 through the lead screw 70 coupled to the stepping motor 100, the screw nut 60 meshed with the lead screw 70, and the spring member 50 mounted on the screw nut 60, occurrence of a problem is avoided, such as unprepared detachment of the substantially circular-hole-shaped alignment hole portion 54 of the covering portion 52 of the spring member 50 from the alignment protrusion 64 of the substantially upper half portion 62 of the screw nut 60 making up the motor assembly 200. The substantially circular-hole-shaped alignment hole portion 54, which is bored substantially in the center of the upper side, i.e., substantially in the center of the substrate portion 55 of the covering portion 52 of the spring member 50, is securely engaged with the alignment protrusion 64, which is formed protruding substantially in the center of the upper side, i.e., substantially in the center of the reference plane portion 65 of the substantially upper half portion 62 of the screw nut 60, and thus, the spring member 50 is securely mounted on the screw nut 60.

An engaging portion 68 that is engaged when the spring member 50 is mounted on the screw nut 60 is provided on the screw nut 60. An engagement lock portion 58 corresponding to the engaging portion 68 of the screw nut 60 is provided on the spring member 50. More specifically describing, an engaging protrusion 68 (engaging portion), which is engaged when the covering portion 52 of the spring member 50 is mounted on the substantially upper half portion 62 of the screw nut 60, is provided on the substantially upper half portion 62 of the screw nut 60. The engaging protrusion 68 of the substantially upper half portion 62 of the screw nut 60 includes one substantially flat-plane-shaped side face portion 68a, which is substantially perpendicular to the substantially flat-plane-shaped reference plane portion 65, and the other substantially plane-shaped side face portion 68b, which is substantially perpendicular to the one substantially flat-plane-shaped side face portion 68a and which is formed being substantially parallel to the substantially flat-plane-shaped reference plane portion 65.

An engagement lock hook portion 58 (engagement lock portion) corresponding to the engagement protrusion 68 of the substantially upper half portion 62 of the screw nut 60 is included in the covering portion 52 of the spring member 50. The engagement lock hook portion 58 of the covering portion 52 of the spring member 50 includes one substantially flat-plate-shaped side plate portion 58a, which is folded substantially in the direction substantially perpendicular to the substantially flat-plate-shaped substrate portion 55, and the other substantially flat-plate-shaped side plate portion 58b, which is substantially perpendicular to the one substantially flat-plate-shaped side plate portion 58a and which is extended substantially in parallel to the substantially flat-plate-shaped substrate portion 55. The one substantially flat-plate-shaped side plate portion 58a of the spring member 50 is formed substantially in parallel to the substantially plate-shaped second side wall portion 21-II making up the lens holder 20. The other substantially flat-plate-shaped side plate portion 58b of the spring member 50 is formed by being folded substantially in the direction substantially perpendicular to the one substantially flat-plate-shaped side plate portion 58a, and thereafter, extending toward the lens holder 20. The one substantially flat-plate-shaped side plate portion 58*a* of the engagement lock hook portion 58 making up the covering portion 52 of the spring member 50 corresponds to the one substantially flat-plane-shaped side face portion 68*a* of the engaging protrusion 68 making up the substantially upper half portion 62 of the screw nut 60. The other substantially flat-plate-shaped side plate portion 58*b* of the engagement lock hook portion 58 making up the covering portion 52 of the spring member 50 corresponds to the other substantially flat-plane-shaped side face portion 68*b* of the engaging protrusion 68 making up the substantially upper half portion 62 of the screw nut 60.

When the mounting structure of the spring member 50 of the lens driving apparatus 1 shown in FIGS. 1 and 2 is made up, the reliability of the lens driving apparatus 1 is more improved. The engagement lock hook portion 58 including the one substantially flat-plate-shaped side plate portion 58*a* and the other substantially flat-plate-shaped side plate portion 58*b* of the spring member 50, which corresponds to the engaging protrusion 68 of the substantially upper half portion 62 of the screw nut 60, is engaged with the engaging protrusion 68 including the one substantially flat-plane-shaped side face portion 68*a* and the other substantially flat-plane-shaped side face portion 68*b* of the substantially upper half portion 62 of the screw nut 60, and thus, the covering portion 52 of the spring member 50 is mounted on the substantially upper half portion 62 of the screw nut 60 making up the motor assembly 200. Therefore, even if the stepping motor 100 of the motor assembly 200 drives to rotate, normally or reversely at a high speed, the lead screw 70 meshed with the screw nut 60, and with the stepping motor driving, the lens holder 20 having the collimator lens 10 mounted thereon is repeatedly and reciprocally driven at a high speed substantially in the optical axis direction L of the collimator lens 10 through the spring member 50 mounted on the screw nut 60, occurrence of a problem is avoided such as unprepared detachment of the engagement lock hook portion 58 of the spring member 50 from the engaging protrusion 68 of the substantially upper half portion 62 of the screw nut 60 making up the motor assembly 200. The engagement lock hook portion 58, which includes the one substantially flat-plate-shaped side plate portion 58*a* and the other substantially flat-plate-shaped side plate portion 58*b* of the spring member 50 and which corresponds to the engaging protrusion 68 of the substantially upper half portion 62 of the screw nut 60, is securely engaged with the engaging protrusion 68, which includes the one substantially flat-plane-shaped side face portion 68*a* and the other substantially flat-plane-shaped side face portion 68*b* of the substantially upper half portion 62 of the screw nut 60, and thus, the spring member 50 is securely mounted on the screw nut 60.

The substantially rectangular-frame-shaped covering portion 52 is formed on the spring member 50 by executing a folding processing for the spring member 50, corresponding to the substantially rectangular-piece-shaped substantially upper half portion 62 of the screw nut 60. The substantially rectangular-frame-shaped covering portion 52 of the spring member 50 is formed in a substantially rectangular-frame shape, and includes: the substantially flat-plate-shaped substrate portion 55, which extending in a substantially planar manner to the substantially deformed-plate-shaped tongue-shaped portion 51 and the substantially rectangular-flat-plate-shaped linking portion 53; a substantially flat-plate-shaped first side plate portion 56, which is folded substantially in the direction substantially perpendicular to the substantially flat-plate-shaped substrate portion 55; a substantially flat-plate-shaped second side plate portion 57, which is folded substantially in the direction substantially perpendicular to the substantially flat-plate-shaped substrate portion 55 and which is arranged substantially in parallel to the substantially flat-plate-shaped first side plate portion 56; a substantially flat-plate-shaped third side plate portion 58*a* (one substantially flat-plate-shaped side plate portion), which is folded substantially in the direction substantially perpendicular to the substantially flat-plate-shaped substrate portion 55 and which is folded substantially in the direction substantially perpendicular to the substantially flat-plate-shaped first side plate portion 56 and the substantially flat-plate-shaped second side plate portion 57; and a substantially flat-plate-shaped fourth side plate portion 58*b* (the other substantially flat-plate-shaped side plate portion), which is folded substantially in the direction substantially perpendicular to the substantially flat-plate-shaped third side plate portion 58*a*, which is folded substantially in the direction substantially perpendicular to the substantially flat-plate-shaped first side plate portion 56 and the substantially flat-plate-shaped second side plate portion 57, and which extends substantially in parallel to the substantially flat-plate-shaped substrate portion 55. The engagement lock hook portion 58 making up the substantially rectangular-frame-shaped covering portion 52 of the spring member 50 has a substantially flat-plate-shaped third side plate portion 58*a*, which is folded substantially in the direction substantially perpendicular to the substantially flat-plate-shaped substrate portion 55, and a substantially flat-plate-shaped fourth side plate portion 58*b*, which is substantially perpendicular to the substantially flat-plate-shaped third side plate portion 58*a* and which extends substantially in parallel to the substantially flat-plate-shaped substrate portion 55.

The substantially rectangular-piece-shaped substantially upper half portion 62 of the screw nut 60 corresponding to the substantially rectangular-frame-shaped covering portion 52 of the spring member 50 is formed in a substantially rectangular-piece-shaped substantially shape, and includes: the substantially flat-plane-shaped reference plane portion 65; a substantially flat-plane-shaped first side face portion 66, which is substantially perpendicular to the substantially flat-plane-shaped reference plane portion 65; a substantially flat-plane-shaped second side face portion 67, which is substantially perpendicular to the substantially flat-plane-shaped reference plane portion 65 and which is substantially in parallel to the substantially flat-plane-shaped first side face portion 66; a substantially flat-plane-shaped third side face portion 68*a* (one substantially flat-plane-shaped side face portion), which is substantially perpendicular to the substantially flat-plane-shaped reference plane portion 65, and which is substantially perpendicular to the substantiall flat-plane-shaped first side face portion 66 and the substantially flat-plane-shaped second side face portion 67; and a substantially flat-plane-shaped fourth side face portion 68*b* (the other substantially flat-plane-shaped side face portion), which is substantially perpendicular to the substantially flat-plane-shaped third side face portion 68*a*, which is substantially perpendicular to the substantially flat-plane-shaped first side face portion 66 and the substantially flat-plane-shaped second side face portion 67, and which is substantially parallel to the substantially flat-plane-shaped reference plane portion 65. The engaging protrusion 68 making up the substantially rectangular-piece-shaped substantially upper half portion 62 of the screw nut 60 includes: the substantially flat-plane-shaped third side face portion 68*a*, which is substantially perpendicular to the substantially flat-plane-shaped reference plane portion 65; and the substantially flat-plane-shaped fourth side face portion 68*b*, which is substantially perpendicular to the substantially flat-plane-shaped third side face portion 68*a* and that is substantially parallel to the substantially flat-plane-shaped reference plane portion 65.

The substantially flat-plate-shaped substrate portion 55 of the substantially rectangular-frame-shaped covering portion 52 of the spring member 50 corresponds to the substantially flat-plane-shaped reference plane portion 65 of the substantially rectangular-piece-shaped substantially upper half portion 62 of the screw nut 60. The substantially flat-plane-shaped first side plate portion 56 of the substantially rectangular-frame-shaped covering portion 52 of the spring member 50 corresponds to the substantially flat-plane-shaped first side face portion 66 of the substantially rectangular-piece-shaped substantially upper half portion 62 of the screw nut 60. The substantially flat-plate-shaped second side plate portion 57 of the substantially rectangular-frame-shaped covering portion 52 of the spring member 50 corresponds to the substantially flat-plane-shaped second side face portion 67 of the substantially rectangular-piece-shaped substantially upper half portion 62 of the screw nut 60. The substantially flat-plate-shaped third side plate portion 58a of the substantially rectangular-frame-shaped covering portion 52 of the spring member 50 corresponds to the substantially flat-plate-shaped third side face portion 68a of the substantially rectangular-piece-shaped substantially upper half portion 62 of the screw nut 60. The substantially flat-plate-shaped fourth side plate portion 58b of the substantially rectangular-frame-shaped covering portion 52 of the spring member 50 corresponds to the substantially flat-plane-shaped fourth side face portion 68b of the substantially rectangular-piece-shaped substantially upper half portion 62 of the screw nut 60. The substantialy rectangular-frame-shaped covering portion 52 of the spring member 50 covers the substantially rectangular-piece-shaped substantially upper half portion 62 of the screw nut 60 such that the portion 52 is engaged with the portion 62.

When the mounting structure of the spring member 50 of the lens driving apparatus 1 shown in FIGS. 1 and 2 is made up, the reliability of the lens driving apparatus 1 is more improved. The substantially rectangular-frame-shaped covering portion 52, which includes the substantially flat-plate-shaped substrate portion 55 and the substantially flat-plate-shaped side plate portions 56, 57, 58a, 58b of the spring member 50 formed by executing a folding processing for the spring member 50 corresponding to the substantially rectangular-piece-shaped substantially upper half portion 62 of the screw nut 60, covers the substantially rectangular-piece-shaped substantially upper half portion 62, which includes the substantially flat-plane-shaped reference plane portion 65 and the substantially flat-plane-shaped side face portions 66, 67, 68a, 68b of the screw nut 60, such that the portion 52 is engaged with the portion 62. Therefore, even if the lens holder 20 having the collimator lens 10 mounted thereon is driven repeatedly and reciprocally at a high speed by the motor assembly 200 substantially in the optical axis direction L of the collimator lens 10, through the spring member 50, occurrence of a problem is avoided such as unprepared detachment of the covering portion 52 of the spring member 50 from substantially upper half portion 62 of the screw nut 60 making up the motor assembly 200. The substantially rectangular-frame-shaped covering portion 52, including the substantially flat-plate-shaped substrate portion 55 and the substantially flat-plate-shaped side plate portions 56, 57, 58a, 58b which are formed by executing a folding processing for the spring member 50 corresponding to the substantially rectangular-piece-shaped substantially upper half portion 62 of the screw nut 60, securely covers the substantially rectangular-piece-shaped substantially upper half portion 62 including the substantially flat-plane-shaped reference plane portion 65 and the substantially flat-plane-shaped side face portions 66, 67, 68a, 68b of the screw nut 60, such that the portion 52 is engaged with the portion 62, and the spring member 50 is securely mounted on the screw nut 60.

The covering portion 52 of the spring member 50 includes the substantially flat-plate-shaped side plate portions 56, 57, 58a, etc., which are folded substantially in the direction substantially perpendicular to the substantially flat-plate-shaped substrate portion 55, and is formed in a substantially rectangular-frame-shaped shape, and thereby, the strength of the covering portion 52 of the spring member 50 is improved. A formed body having folded portions each formed thereon by executing a folding processing for a flat-plate-shaped plate material is more difficult to be deformed than a plate material formed simply in a flat-plate-shaped shape, for example. The substantially rectangular-frame-shaped covering portion 52 is formed on the spring member 50 by folding the substantially flat-plate-shaped side plate portions 56, 57, 58a, etc., substantially in the direction substantially perpendicular to the substantially flat-plate-shaped substrate portion 55. Therefore, even if the motor assembly 200 repeatedly and reciprocally drives at a high speed the lens holder 20 having collimator lens 10 mounted thereon through the spring member 50 substantially in the optical axis direction L of the collimator lens 10, occurrence of a problem is apt to be avoided such as plastic deformation of the covering portion 52 of the spring member 50 that covers the substantially upper half portion 62 of the screw nut 60 making up the motor assembly 200.

For example, when the covering portion 52 of the spring member 50 is mounted on the substantially upper half portion 62 of the screw nut 60: the substantially circular-hole-shaped alignment hole portion 54 bored substantially in the center of the upper side of the covering portion 52 of the spring member 50, is engaged with the alignment protrusion 64, which is formed protruding substantially in the center of the upper side of the substantially upper half portion 62 of the screw nut 60; the engagement lock hook portion 58 of the spring member 50 corresponding to the engaging protrusion 68 of the substantially upper half portion 62 of the screw nut 60 is engaged with the engaging protrusion 68 of the substantially upper half portion 62 of the screw nut 60, so that the covering portion 52 of the spring member 50 is mounted on the screw nut 60 making up the motor assembly 200. Thereby, the spring member 50 is more securely mounted on the screw nut 60.

For example, the engagement lock hook portion 58 of the spring member 50 corresponding to the engaging protrusion 68 of the substantially upper half portion 62 of the screw nut 60 is engaged with the engaging protrusion 68 of the substantially upper half portion 62 of the screw nut 60, the covering portion 52 of the spring member 50 is mounted on the screw nut 60 making up the motor assembly 200, and the substantially rectangular-frame-shaped covering portion 52 of the spring member 50, which is formed by executing a folding processing for the spring member 50 corresponding to the substantially rectangular-piece-shaped substantially upper half portion 62 of the screw nut 60, covers the substantially rectangular-piece-shaped substantially upper half portion 62 of the screw nut 60 such that the portion 52 engages with the portion 62. Thereby, the spring member 50 is more securely mounted on the screw nut 60.

For example, when the substantially rectangular-frame-shaped covering portion 52 of the spring member 50, which is formed by executing a folding processing for the spring member 50 corresponding to the substantially rectangular-piece-shaped substantially upper half portion 62 of the screw nut 60, covers the substantially rectangular-piece-shaped substantially upper half portion 62 of the screw nut 60 such that the portion 52 engages with the portion 62, and the covering portion 52 of the spring member 50 is mounted on the substantially upper half portion 62 of the screw nut 60, the substantially circular-hole-shaped alignment hole portion 54, which is bored substantially in the center of the upper side of the covering portion 52 of the spring member 50, is engaged with the alignment protrusion 64, which is formed protruding substantially in the center of the upper side of the substantially upper half portion 62 of the screw nut 60, so that the spring member 50 is more securely mounted on the screw nut 60.

For example, when the covering portion 52 of the spring member 50 is mounted on the substantially upper half portion 62 of the screw nut 60, the substantially circular-hole-shaped alignment hole portion 54, which is bored substantially in the center of the upper side of the covering portion 52 of the spring member 50, is engaged with the alignment protrusion 64, which is formed protruding substantially in the center of the upper side of the substantially upper half portion 62 of the screw nut 60; and the engagement lock hook portion 58 of the spring member 50 corresponding to the engaging protrusion 68 of the substantially upper half portion 62 of the screw nut 60 is engaged with the engaging protrusion 68 of the substantially upper half portion 62 of the screw nut 60, so that the covering portion 52 of the spring member 50 is mounted on the screw nut 60 making up the motor assembly 200, and the substantially rectangular-frame-shaped covering portion 52 of the spring member 50, which is formed by executing a folding processing for the spring member 50 corresponding to the substantially rectangular-piece-shaped substantially upper half portion 62 of the screw nut 60, covers the substantially rectangular-piece-shaped substantially upper half portion 62 of the screw nut 60 such that the portion 52 engages with the portion 62. Thereby, the spring member 50 is more securely mounted on the screw nut 60.

When the spring member 50 is mounted on the screw nut 60 as above, the spring member 50 can be securely mounted on the screw nut 60 without the adhesive to be applied between the spring member 50 and the screw nut 60 to joint the spring member 50 and the screw nut 60, for example.

The substantially deformed-plate-shaped tongue-shaped portion 51 making up the spring member 50 is formed extending substantially in the direction T substantially perpendicular to the screw extending direction S, the substantially rectangular-frame-like covering portion 52 making up the spring member 50 is formed extending substantially in the direction T substantially perpendicular to the screw extending direction S, and the substantially rectangular-flat-plate-shaped linking portion 53 joints the tongue-shaped portion 51 and the covering portion 52 of the spring member 50, so that the spring member 50 including the tongue-shaped portion 51, the covering portion 52 and the linking portion 53 is formed extending substantially in the spring member extending direction T substantially perpendicular to the screw extending direction S.

In the case where the spring member 50 is mounted on the screw nut 60, for example, while the substantially flat-plate-shaped substrate portion 55, extending in a substantially flat-plate-shaped form to the substantially deformed-plate-shaped tongue-shaped portion 51 and the substantially rectangular-flat-plate-shaped linking portion 53, is inclined relative to the substantially flat-plane-shaped reference plane portion 65 of the screw nut 60, the fourth side plate portion 58b of the engagement lock hook portion 58 of the spring member 50 is slightly slantingly hooked on the fourth side face portion 68b of the engaging protrusion 68 mounted on the substantially upper half portion 62 of the screw nut 60. The elongated spring member 50 is rotated substantially about the fourth side plate portion 58b of the engagement lock hook portion 58 of the spring member 50, and the substantially circular-hole-shaped alignment hole portion 54, which is bored substantially in the center of the substrate portion 55 of the covering portion 52 of the spring member 50, is engaged with the alignment protrusion 64, which is formed protruding substantially in the center of the reference plane portion 65 of the substantially upper half portion 62 of the screw nut 60. As above, the substantially rectangular-frame-shaped covering portion 52 of the spring member 50, including the substantially flat-plate-shaped substrate portion 55 and the substantially flat-plate-shaped side plate portions 56, 57, 58a, 58b, covers the substantially rectangular-piece-shaped upper half portion 62 of the screw nut 60, including the substantially flat-plane-shaped reference plane portion 65 and the substantially flat-plane-shaped side face portions 66, 67, 68a, 68b, such that the portion 52 is engaged with the portion 62.

To prevent the vibration of the motor assembly 200 from being transmitted to the spring member 50 without being suppressed, depending on the design/specification, etc., of the lens driving apparatus 1 or the design/specification, etc., of the optical pickup apparatus including the lens driving apparatus 1, for example, any of various vibration absorbing material (not shown) such as a synthetic polymeric pad capable of suppressing the vibration may intervene between the reference plane portion 65 of the female screw 60 and the substrate portion 55 of the spring member 50 when the spring member 50 is mounted on the screw nut 60 of the motor assembly 200.

To avoid interference of the screw main body 73 of the substantially bar-shaped lead screw 70 with the substantially flat-plate-shaped side plate portions 56, 57 making up the substantially rectangular-frame-shaped covering portion 52 of the spring member 50, a substantially slightly-curved-face-shaped interference avoidance portion 59, for example, a cutout portion 59, corresponding to the substantially bar-shaped screw main body 73 of the lead screw 70 is formed on the substantially flat-plate-shaped side plate portions 56, 57 making up the substantially rectangular-frame-shaped covering portion 52 of the spring member 50.

The substantially slightly-curved-face-shaped cutout portion 59 corresponding to the substantially bar-shaped screw main body 73 of the lead screw 70 is formed on the substantially flat-plate-shaped side plate portions 56, 57 making up the substantially rectangular-frame-shaped covering portion 52 of the spring member 50, Therefore, there is avoided occurrence of a problem that the pair of substantially flat-plate-shaped side plate portions 56, 57 making up the substantially rectangular-frame-shaped covering portion 52 of the spring member 50 contacts with the substantially bar-shaped lead screw 70.

The substantially rectangular-through-hole-shaped connection fixing hole portion 21 corresponding to the substantially plate-shaped tongue-shaped portion 51 of the spring member 50 is bored on the upper side of the substantially plate-shaped side wall portion 20II making up the lens holder 20. The substantially plate-shaped tongue-shapedslightly-curved-face-shaped portion 51 of the spring member 50 is mounted by inserting and fitting to the connection fixing hole portion 21 of the substantially plate-shaped side wall portion 20II making up the lens holder 20.

When the mounting structure of the spring member 50 of the lens driving apparatus 1 shown in FIGS. 1 and 2 is configured, the reliability of the lens driving apparatus 1 is improved. The substantially plate-shaped tongue-shaped portion 51 of the spring member 50 is mounted by inserting and fitting to the substantially rectangular-through-hole-shaped connection fixing hole portion 21 of the substantially plate-shaped side wall portion 20II of the lens holder 20 corresponding to the substantially plate-shaped tongue-shaped portion 51 of the spring member 50, and therefore, even if the motor assembly 200 repeatedly and reciprocally drives at a high speed the lens holder 20 having the collimator lens 10 mounted thereon substantially in the optical axis direction L of the collimator lens 10 through the spring member 50, occurrence of a problem is avoided such as unprepared detachment of the tongue-shaped portion 51 of the spring member 50 from the connection fixing hole portion 21 of the substantially plate-shaped side wall portion 20II of the lens holder 20 including the collimator lens 10. The substantially plate-shaped tongue-shaped portion 51 of the spring member 50 is securely mounted by inserting and fitting to the substantially rectangular-through-hole-shaped connection fixing hole portion 21 of the substantially plate-shaped side wall portion 20II of the lens holder 20 corresponding to the substantially plate-shaped tongue-shaped portion 51 of the spring member 50, so that the spring member 50 is securely mounted on the lens holder 20.

As shown in FIG. 2, mounting facilitating portions 23a, 23b are provided on an opening 22 of the substantially rectangular-through-hole-shaped connection fixing hole portion 21 of the lens holder 20, to facilitate the mounting of the substantially plate-shaped tongue-shaped portion 51 of the spring member 50 on the connection fixing hole portion 21 of the lens holder 20 when the substantially plate-shaped tongue-shaped portion 51 of the spring member 50 is mounted on the connection fixing hole portion 21 provided on the lens holder 20. More specifically describing, an inclined insertion face portion (mounting facilitating portion) 23a is provided on the lower side of the opening 22 of the connection fixing hole portion 21 of the lens holder 20 to facilitate the mounting of the substantially plate-shaped tongue-shaped portion 51 of the spring member 50 on the connection fixing hole portion 21 of the lens holder 20 when the substantially plate-shaped tongue-shaped portion 51 of the spring member 50 is mounted on the substantially rectangular-through-hole-shaped connection fixing hole portion 21 provided on the lens holder 20. Otherwise, a cutout portion 23b (mounting facilitating portion) is provided on the upper side of the opening 22 of the connection fixing hole portion 21 of the lens holder 20, to facilitate the mounting of the substantially plate-shaped tongue-shaped portion 51 of the spring member 50 on the connection fixing hole portion 21 of the lens holder 20 when the substantially plate-shaped tongue-shaped portion 51 of the spring member 50 is mounted on the substantially rectangular through hole like rectangular-through-hole-shaped connection fixing hole portion 21 provided on the lens holder 20.

When the mounting structure of the spring member 50 of the lens driving apparatus 1 shown in FIGS. 1 and 2 is configured, the spring member 50 is easily and promptly mounted on the lens holder 20 including the collimator lens 10. In the case where the substantially plate-shaped tongue-shaped portion 51 of the spring member 50 is mounted on the substantially rectangular-through-hole-shaped connection fixing hole portion 21 provided on the lens holder 20, if a tip portion 51a of the substantially plate-shaped tongue-shaped portion 51 of the spring member 50 is introduced from the opening 22 of the connection fixing hole portion 21 of the lens holder 20 into a housing portion 24, i.e., a housing space 24, for example, as the tip portion 51a makes slidingly contact with the inclined insertion face portion 23a that is provided on the lower side of the opening 22 of the connection fixing hole portion 21 of the lens holder 20, the mounting operation of the spring member 50 on the lens holder 20 including the collimator lens 10 is promptly executed. Otherwise, in the case where the substantially plate-shaped tongue-shaped portion 51 of the spring member 50 is mounted on the substantially rectangular-through-hole-shaped connection fixing hole portion 21 provided on the lens holder 20, if the tip portion 51a of the substantially plate-shaped tongue-shaped portion 51 of the spring member 50 is introduced from the opening 22 of the connection fixing hole portion 21 of the lens holder 20 into the housing portion 24, i.e., a housing space 24, for example, as the tip portion 51a is in contact with the cutout portion 23b that is provided on the upper side of the opening 22 of the connection fixing hole portion 21 of the lens holder 20, the mounting operation of the spring member 50 on the lens holder 20 including the collimator lens 10 is relatively promptly executed. Therefore, the assembling process of the lens driving apparatus 1 is speeded up. Thus, the lens driving apparatus 1 is reduced in price. And thus, the optical pickup apparatus including the lens driving apparatus 1 is reduced in price.

An application facilitating portion 23b (mounting facilitating portion) (FIGS. 1 and 2) is provided on the opening 22 of the connection fixing hole portion 21 of the lens holder 20 to facilitate secure application of a sufficient amount of the adhesive 40 to the connection fixing hole portion 21 of the lens holder 20 when the substantially plate-shaped tongue-shaped portion 51 of the spring member 50 is fixed to the substantially rectangular-through-hole-shaped connection fixing hole portion 21 of the lens holder 20 by using the adhesive 40 after the substantially plate-shaped tongue-shaped portion 51 of the spring member 50 is inserted into the substantially rectangular-through-hole-shaped connection fixing hole portion 21 provided on the lens holder 20. The application facilitating portion 23b, provided on the opening 22 of the connection fixing hole portion 21 on the upper side of the substantially plate-shaped side wall portion 20II making up the lens holder 20, is formed as the substantially concave cutout portion 23b provided on the opening 22 of the connection fixing hole portion 21 on the upper side of the substantially plate-shaped side wall portion 20II making up the lens holder 20.

When the mounting structure of the spring member 50 of the lens driving apparatus 1 shown in FIGS. 1 and 2 is made up, there is apt to be avoided the vibration remaining in the lens holder 20 for a short time period after the stepping motor 100 of the motor assembly 200 stops. The substantially concave cutout portion 23b is provided on the opening 22 of the connection fixing hole portion 21 of the lens holder 20 to facilitate secure application of the sufficient amount of the adhesive 40 to the connection fixing hole portion 21 on the upper side of the substantially plate-shaped side wall portion 20II making up the lens holder 20, and therefore, the sufficient amount of the adhesive 40 is securely applied to the opening 22 of the connection fixing hole portion 21 on the upper side of the substantially plate-shaped side wall portion 20II making up the lens holder 20. When the substantially plate-shaped tongue-shaped portion 51 of the spring member 50 is fixed to the lens holder 20 using the adhesive 40 after the substantially plate-shaped tongue-shaped portion 51 of the spring member 50 is inserted into the substantially rectangular-through-hole-shaped connection fixing hole portion 21 provided on the upper side of the substantially plate-shaped side wall portion 20II of the lens holder 20, there is apt to be avoided occurrence of such a problem that, for example, the amount of the adhesive 40 to be applied is insufficient, and this causes insufficient absorption of the vibration by the adhesive 40, and as a result, the vibration transmitted from the motor assembly 200 to the lens holder 20 including the collimator lens 10 through the spring member 50 is not sufficiently suppressed.

The substantially concave cutout portion 23*b* (FIGS. 1 and 2) on the upper side of the opening 22 of the connection fixing hole portion 21 on the upper side of the substantially plate-shaped side wall portion 20II making up the lens holder 20 is provided, and therefore, when the application operation of the adhesive 40 that joints the lens holder 20 and the spring member 50 is executed in the state, for example, shown in FIG. 2, the application operation of the adhesive 40 is easily and promptly executed. After the substantially plate-shaped tongue-shaped portion 51 of the spring member 50 is inserted to be fit into the substantially rectangular-through-hole-shaped connection fixing hole portion 21 provided on the upper side of the substantially plate-shaped side wall portion 20II of the lens holder 20, the adhesive 40 can be applied, obliquely from the above, to the opening 22 of the substantially rectangular-through-hole-shaped connection fixing hole portion 21, for example. Thereby, the application operation of the adhesive 40 is easily and promptly executed. The application operation of the adhesive 40 is easily and promptly executed, and thereby, the assembling process of the lens driving apparatus 1 and the assembling process of the optical pickup apparatus including the lens driving apparatus 1 are promptly executed. Therefore, the lens driving apparatus 1 and the optical pickup apparatus including the lens driving apparatus 1 is reduced in price.

When the substantially plate-shaped tongue-shaped portion 51 of the spring member 50 is fixed to the substantially rectangular-through-hole-shaped connection fixing hole portion 21 on the upper side of the substantially plate-shaped side wall portion 20II making up the lens holder 20 by using the adhesive 40 after the substantially plate-shaped tongue-shaped portion 51 of the spring member 50 is inserted and fit into the substantially rectangular-through-hole-shaped connection fixing hole portion 21 provided on the upper side of the substantially plate-shaped side wall portion 20II of the lens holder 20 (FIGS. 1 and 2), since the large housing space 24 allowing the adhesive 40 to be able to enter is secured in the connection fixing hole portion 21 on the upper side of the substantially plate-shaped side wall portion 20II of the lens holder 20, the sufficient amount of the adhesive 40 is securely applied on the connection fixing hole portion 21 on the upper side of the substantially plate-shaped side wall portion 20II making up the lens holder 20.

As in FIG. 2, the adhesive 40 is applied in substantially point adhesion form on the opening 22 of the substantially rectangular-through-hole-shaped connection fixing hole portion 21 of the lens holder 20 into which the substantially plate-shaped tongue-shaped portion 51 of the spring member 50 is inserted and fit. More specifically describing, the adhesive 40 adheres/cured in substantially the point adhesion form to/on the opening 22 of the substantially rectangular-through-hole-shaped connection fixing hole portion 21 of the lens holder 20 into which the substantially plate-shaped tongue-shaped portion 51 of the spring member 50 is inserted.

When the mounting structure of the spring member 50 of the lens driving apparatus 1 shown in FIGS. 1 and 2 is made up, the vibration transmitted from the motor assembly 200 to the lens holder 20 including the collimator lens 10 through the spring member 50 is apt to be substantially eliminated. The adhesive 40 adheres and cures in substantially the point adhesion form to the opening 22 of the substantially rectangular-through-hole-shaped connection fixing hole portion 21 of the lens holder 20 into which the substantially plate-shaped tongue-shaped portion 51 of the spring member 50 is inserted, and adhesive 40 adhering and curing in substantially the point adhesion form properly absorbs the vibration generated from the motor assembly 200. Therefore, the vibration transmitted to the lens holder 20 including the collimator lens 10 is substantially eliminated by the adhesive 40.

As shown in FIG. 2, after the substantially plate-shaped tongue-shaped portion 51 of the spring member 50 is inserted and fit into the substantially rectangular-through-hole-shaped connection fixing hole portion 21 provided on the upper side of the substantially plate-shaped side wall portion 20II of the lens holder 20, the adhesive 40 adheres and cures in substantially the point adhesion form only at one point to the opening 22 of the substantially rectangular-through-hole-shaped connection fixing hole portion 21. In this case, the adhesive that joints the spring member 50 and the screw nut 60 is not applied between the spring member 50 and the screw nut 60. The adhesive 40 is applied only at one point between the spring member 50 and the lens holder 20 to joint the spring member 50 and the lens holder 20, and thereby, only the minimum required amount of the adhesive 40 is used so that waste of the adhesive 40 is reduced. Therefore, the lens driving apparatus 1 and the optical pickup apparatus having the lens driving apparatus 1 is reduced in price.

The adhesive 40 is applied only at one point between the spring member 50 and the lens holder 20 to joint the spring member 50 and the lens holder 20 and, thereby, the application operation of the adhesive 40 is promptly executed. The application process of the adhesive 40 is promptly executed, so that the assembling process of the lens driving apparatus 1 and the assembling process of the optical pickup apparatus including the lens driving apparatus 1 are efficiently executed. Thereby, the speed of the assembling process of the lens driving apparatus 1 and the assembling process of the optical pickup apparatus including the lens driving apparatus 1 is improved. Thus, the lens driving apparatus 1 and the optical pickup apparatus including the lens driving apparatus 1 is reduced in price.

As the spring member 50 (FIGS. 1 and 2), there is used a substantially thin-walled metal plate spring member 50 formed by executing a press working such as a stamping processing or a folding processing for a substantially thin-walled substantially plate-shaped metal material (not shown). The plate spring member 50 includes a flat plate portion 50*a* plate-spring-shaped flat plate portion) that has a substantially plate-spring-shaped shape.

Since the substantially thin-plate-shaped metal plate spring member 50 including the flat plate portion 50*a* in the substantially plate-spring-shaped shape is used as the spring member 50, there is apt to be avoided the vibration remaining in the lens holder 20 for a short time period after the stepping motor 100 of the motor assembly 200 stops. While the motor assembly 200 is driving or immediately after the motor assembly 200 stops driving, the vibration transmitted from the screw nut 60 of the motor assembly 200 to the lens holder 20 including the collimator lens 10 through the plate spring member 50 is securely attenuated by the flat plate portion 50*a* of the substantially thin-walled metal plate spring member 50.

The plate spring member 50 is formed by using a metal material that is excellent in elastic property. More specifically describing, the plate spring member 50 is formed by pressing by executing a pressing working such as a stamping processing or a folding processing for a phosphor bronze plate material that is excellent in strength, spring property, corrosion resistance, etc., and is usable as a conductor. The plate spring member 50 is formed by stamping by a press forming machine using a metal material plate including copper as its main component, for example. As the metal material including copper (Cu) as its main component, there is preferably used a copper alloy including about 3.5 to 9 weight/mass % of tin (Sn) and about 0.03 to 0.5 weight/mass % of phosphorus (P), for example. More specifically describing, as the copper alloy including copper as its main component, about 7 to 9 weight/mass % of tin (Sn) and about 0.03 to 0.35 weight/mass % of phosphorus (P), there may be used "spring-use phosphor bronze" that is excellent in strength, spring property, fatigue resistance, corrosion resistance, etc., for example. The spring-use phosphor bronze plate material can be, for example, C5210 (C5210P) or C5212 (C5212P) defined based on "JIS H 3130".

The plate spring member (50) maybe formed using, for example, stainless steel (SUS) that is excellent in corrosion resistance instead of the phosphor bronze. By using the metal plate spring member (50) of phosphor bronze, stainless steel, etc., for example, a large vibration component is attenuated.

As the adhesive 40, there is used the synthetic polymeric adhesive 40 that can be easily and promptly applied to an object in the point adhesion form.

When the spring member 50 and either or both of the lens holder 20 including the collimator lens 10 and the screw nut 60 making up the motor assembly 200 are jointed by using the synthetic polymeric adhesive 40, there is avoided the vibration remaining in the lens holder 20 for a short time period after the motor assembly 200 stops. While the motor assembly 200 is driving or immediately after the motor assembly 200 stops driving, the vibration transmitted from the screw nut 60 of the motor assembly 200 to the lens holder 20 including the collimator lens 10 through the spring member 50 is securely absorbed by the synthetic polymeric adhesive 40 that joints the spring member 50 and either or both of the lens holder 20 including the collimator lens 10 and the screw nut 60 making up the motor assembly 200.

By using the synthetic polymeric adhesive 40 that is easily and promptly applicable to an object in the point adhesion form, the application operation is easily and promptly executed of the adhesive 40 executed to joint the spring member 50 and either or both of the lens holder 20 including the collimator lens 10 and the screw nut 60 making up the motor assembly 200.

As the adhesive, an electron-beam-curing-type adhesive is used which is cured by applying an electron beam such as a light beam. More specifically describing, an ultraviolet-curing-type adhesive is used which is cured by applying an ultraviolet light beam as the adhesive.

Thus, the spring member 50 is promptly fixed with high precision to either or both of the lens holder 20 including the collimator lens 10 and the screw nut 60 making up the motor assembly 200. The adhering operation of the spring member 50 to either or both of the lens holder 20 including the collimator lens 10 and the screw nut 60 making up the motor assembly 200 is promptly executed. Therefore, the adhering process in the assembling process of the lens driving apparatus 1 is speeded up. By using the electron-beam-curing-type adhesive such as the ultraviolet-curing-type adhesive, the assembling procedure of the lens driving apparatus 1 is efficiently and promptly executed. Thus, the lens driving apparatus 1 is reduced in price. Associated with this, the optical pickup apparatus The ultraviolet-curing-type adhesive, which is one of the electron-beam-curing-type adhesive, can be, for example, an optical UV adhesive, "NOA60" or "NOA83H", etc. by NOR-LAND PRODUCTS INC in the U.S. The ultraviolet-curing-type adhesive such as the optical UV adhesives, NOA60 or NOA83H is acrylic and is a one-liquid-type ultraviolet-curing-type adhesive. An acrylic ultraviolet-curing-type adhesive has a short curing time and can be cured in several seconds. "UV" means "ultraviolet". An ultraviolet-curing-type adhesive is called UV-curing-type adhesive, etc.

The ultraviolet-curing-type adhesive, which is one of the electron-beam-curing-type adhesive, can be, for example, "OPTOCAST" series, etc. by EMI in the U.S. Specific ultraviolet-curing-type adhesives can be OPTOCAST3400, OPTOCAST3415, etc. by EMI in the U.S. The ultraviolet-curing-type adhesives such as OPTOCAST3400 and OPTOCAST3415 are epoxy and one-liquid-type ultraviolet-curing-type adhesives. An epoxy ultraviolet-curing-type adhesive has a low shrink property and a high heat resistance, and has an excellent chemical resistance and an excellent moisture resistance. By using a one-liquid-type ultraviolet-curing-type adhesive, there is not required the mixing operation for liquids to be executed when using a two-liquid-type ultraviolet-curing-type adhesive. Therefore, the application process of the adhesive is promptly and efficiently executed.

Depending on the design/specification of the lens driving apparatus 1 and the design/specification of the optical pickup apparatus including the lens driving apparatus 1, for example, those apparatuses are also usable for which the adhering process is executed by using a two-liquid-type ultraviolet-curing-type adhesive. The two-liquid-type ultraviolet-curing-type adhesive can be, for example, a two-liquid-type epoxy ultraviolet-curing-type adhesive. By using a polymeric adhesive such as an acryl adhesive or an epoxy adhesive, a high vibration component is absorbed, for example.

By forming the collimator lens 10 using a synthetic resin material, the collimator lens 10 is reduced in weight. The substantially convex-lens-shaped synthetic resin collimator lens 10 is efficiently mass-produced based on injection molding. By enabling the mass-production of the collimator lens 10, the collimator lens 10 is reduced in price.

For example, in the case where a curved-surfaced convex lens (not shown) is formed using glass as its material, it is worried that the convex lens is difficult to be reduced in weight. However, by manufacturing the collimator lens 10 using a transparent or translucent synthetic resin material and based on the injection molding excellent in mass-production, the manufacturing/processing of the collimator lens 10 is easily executed, and thereby, the collimator lens 10 is reduced in price and also a light-weighted lens 10 is formed.

By forming the collimator lens 10 using a synthetic resin material and based on the injection molding, a lens driving mechanism 1 is, for example, reduced in weight and made up as the lens driving mechanism 1 which can be reduced in price. The lens driving mechanism 1 including the lens holder 20 having the synthetic resin collimator lens 10 is made up after the synthetic resin collimator lens 10 is formed based on the injection molding, and thereby, there can be provided the lens driving mechanism 1 which can be reduced in weight and cost.

The lens 10 is formed using, for example, a thermoplastic heat-resistant synthetic resin material that is injection-moldable and transparent or translucent. More specifically describing, the lens 10 is formed using, for example, the composition including, as a base material, an acrylic/methacrylic resin material with high transparency which is excellent in weather resistance, mirror smoothness, precision, etc. The standard nomenclature of "methacrylic resin" is "polymethyl methacrylate" and polymethylmethacrylate is abbreviated to, for example, "PMMA". The methacrylic resin may also be referred to as "acrylic resin". The lens (10) is formed using, for example, the composition including, as a base material, a polycarbonate resin which has excellent processability and is reduced in price. "Polycarbonate" is abbreviated to, for example, "PC".

The lens 10 is formed using, for example, the composition including a PMMA resin as its base material. The composition including PMMA as its base material can be, for example, Acrypet (registered trademark), etc. by Mitsubishi Rayon Co., Ltd. A specific PMMA can be, for example, Acrypet VH001, V001, etc. by Mitsubishi Rayon Co., Ltd. For example, the specific gravity of Acrypet VH001, V001 by Mitsubishi Rayon Co., Ltd. is about 1.19. The specific gravity of the composition, etc., including a synthetic resin material as its base material is obtained by using a testing method based on, for example, "ASTM D792", "ISO1183", and "JIS K 7112". For example, the total light transmittance of Acrypet VH001 by Mitsubishi Rayon Co., Ltd. according to the testing method based on "JIS K 7361" is about 92.5%. For example the total light transmittance of Acrypet V001 by Mitsubishi Rayon Co., Ltd. according to the testing method based on "JIS K 7361" is about 93%.

The lens 10 is formed using, for example, the composition including PC as its base material. The composition including PC as its base material can be, for example, Panlite (registered trademark), etc. by Teijin Chemicals Ltd. A specific PC can be, for example, Panlite AD-5503, etc. by Teijin Chemicals Ltd. For example, the specific gravity of Panlite AD-5503 by Teijin Chemicals Ltd. is about 1.2. For example the total light transmittance of Panlite AD-5503 by Teijin Chemicals LTD. according to the testing method based on "ASTM D 1003" (thickness of 3 mm) is about 89%.

When the lens 10 is formed using the thermoplastic heat-resistant synthetic resin material that is injection-moldable and transparent or translucent, the response characteristic of the lens driving mechanism 1 is improved. A resin material has a smaller specific gravity than that of, for example, a metal material. Therefore, the resin material is a material suitable for reduction of weight. For example, while the specific gravity of glass is about 2.2 to 2.8 and the specific gravity of lead glass is about 3.4 to 4.28, for example, the specific gravity of PMMA is about 1.16 to 1.2. For example, the specific gravity of PC is about 1.2 and the specific gravity of PC including a filler is about 1.4 to 1.43. When the lens 10 is formed using the thermoplastic heat-resistant synthetic resin material that is injection-moldable and transparent or translucent, reduction of the weight of the lens 10 is facilitated. By forming the lens 10 using the synthetic resin material, reduction of the weight of the lens holder 20 including the lens 10 is facilitated. As a result, the lens holder 20 becomes easily moved. Because the lens holder 20 becomes easily moved by reducing the weight of the lens holder 20, the response characteristic of the lens driving mechanism 1 including the lens holder 20 is improved.

The light transmittance or the transparency of the transparent synthetic resin material from which the lens 10 is formed is, for example, about 80% or higher and 100% or lower, preferably about 85% or higher and 100% or lower, and more preferably about 88% or higher and 100% or lower. For example, if the light transmittance or the transparency of the transparent synthetic resin material from which the lens 10 is formed is a low value that is about 80% or lower, the material is not preferable because the efficiency of the light passing through the lens 10 is reduced. For example, when the light transmittance or the transparency of the transparent synthetic resin material from which the lens 10 is formed is a high value of preferably about 85% or higher and more preferably about 88% or higher, the reduction of the efficiency of the light passing through the lens 10 is apt to be avoided. It is preferable that the lens 10 is formed using the composition including a transparent synthetic resin material having a high value of the light transmittance or the transparency. For example, the light transmittance or transparency of the transparent synthetic resin material from which the lens 10 is formed is ideally a value of about 100% or a value in the vicinity of about 100%.

Depending on the design/specification of the lens driving apparatus 1 and the optical pickup apparatus including the lens driving apparatus 1, for example, the lens 10 may be formed using a translucent or transparent glass material having light transmittance or transparency of about 80% or higher and 100% or lower, instead of the translucent or transparent synthetic resin material.

The holding member 20 is formed using a thermoplastic heat-resistant synthetic resin material that is injection-moldable. The female screw 60 is formed using a thermoplastic heat-resistant synthetic resin material that is injection-moldable.

More specifically describing, the lens holder 20 and/or the screw nut 60 are/is formed using, for example, the composition including, as a base material, a poly arylene sulfide (PAS) resin such as polyphenylene sulfide (PPS) resin which is excellent in mechanical characteristics, sliding characteristics, dimension stability, heat resistance, injection-molding characteristics, and electric characteristics including an excellent insulating characteristics, and which enables more reduction of the weight than steel materials.

The composition including PPS as a base material can be, for example, DIC (registered trademark) by DIC (former company name: Dainippon Inki Kagaku Kogyo). A specific composition including PPS as a base material can be, for example, "DIC·PPS FZ-2100" by DIC which is unreinforced-linear-type PPS, "DIC·PPS FZ-2130" by DIC which is 30%-glass-fiber-reinforced-linear-type PPS, and "DIC·PPS FZ-1140-D9" by DIC which is 40%-glass-fiber-reinforced-crosslinked-type PPS. For example, the specific gravity of "DIC·PPS FZ-2100" by DIC is about 1.35. For example, the specific gravity of "DIC·PPS FZ-2130" by DIC is about 1.56. For example, the specific gravity "DIC·PPS FZ-1140-D9" by DIC is about 1.66.

A molded product formed from the linear PPS (linear-type PPS) composition has, for example, a high stretchability and excellent toughness. As compared with this, a molded product formed from the crosslinked-type PPS composition has a higher modulus of elasticity than that of the molded product formed from the linear-type PPS composition. A molded product formed from the semi-crosslinked-type PPS composition has, for example, characteristics of both of the molded product formed from the linear-type PPS composition and the molded product formed from the crosslinked-type PPS composition.

The lens holder 20 and/or the screw nut 60 are/is formed using, for example, the composition including, as a base material, a ketonic resin such as a polyetheretherketone resin that is excellent in strength characteristics, sliding characteristics, heat resistance, and injection molding characteristics, and that enables more reduction of the weight than a steel material, etc. A ketone resin can be, for example, a polyetheretherketone resin and a polyaryletherketone resin. "Polyetheretherketone" is abbreviated to, for example, "PEEK" (registered trademark). "Polyaryletherketone" is abbreviated to, for example, "PAEK".

The composition including, as a base material, a PEEK material can be, for example, "VICTREX" (registered trademark) PEEK (registered trademark)" produced by Victrex plc, UK and distributed by Victrex Japan (former name: Victrex-MC, Inc.). The "VICTREX" (registered trademark) products can be, for example, "VICTREX PEEK 450G", "VICTREX M1000", and "VICTREX M2000". For example, the specific gravity of "VICTREX PEEK450GL30" produced by Victrex plc, UK and distributed by Victrex Japan is about 1.51. For example, the specific gravity of "VICTREX M1000" produced by Victrex plc, UK and distributed by Victrex Japan is about 1.35. For example, the specific gravity of "VICTREX M2000" produced by Victrex plc, UK and distributed by Victrex Japan is about 1.37.

The lens holder 20 and/or the screw nut 60 are/is formed using, for example, the composition including, as a base material, a liquid crystal polymer (LCP) that is excellent in thin-wall molding characteristics, heat resistance, and injection molding characteristics and that enables more reduction of the weight than a steel material, etc. A liquid crystal polymer can be, for example, wholly aromatic liquid crystal resins excellent in heat resistance.

The composition including, as a base material, a type-I liquid crystal that has an excellent heat resistance can be, for example, Sumikasuper (registered trademark) by Sumitomo Chemical Co., Ltd. The Sumikasuper (registered trademark) products can be, for example, E5008L and E6008. For example, the specific gravity of "Sumikasuper E5008" by Sumitomo Chemical Co., Ltd. is about 1.69. For example, the specific gravity of "Sumikasuper E6008" by Sumitomo Chemical Co., Ltd. is about 1.7.

A type-I liquid crystal polymer having an excellent heat resistance can be, for example, Xydar (registered trademark) by Nippon Oil Corporation. The Xydar (registered trademark) products can be, for example, 300 series, 400 series, RC, FC series. More specifically describing, the Xydar (registered trade mark) products can be, for example, Grade M-350, Grade M-450, Grade FC-110, and Grade FC-120. For example, the specific gravity of Xydar "Grade M-350" and "Grade M-450" by Nippon Oil Corporation is about 1.84. For example, the specific gravity of Xydar "Grade FC-110" by Nippon Oil Corporation is about 1.7.

The composition including, as a base material, a type-II liquid crystal polymer can be, for example, Vectra (registered trademark) by Polyplastics Co., Ltd. The Vectra (the registered trademark) products can be, for example, Grade A410 and S471. For example, the specific gravity of Vectra "Grade A410" by Polyplastics Co., Ltd. is about 1.84. For example, the specific gravity of Vectra "Grade S471" by Polyplastics Co., Ltd. is about 1.77.

The LCPs of type I and type II are, for example, wholly aromatic liquid crystal polyesters. Since the LCPs of type I, etc., are, for example, excellent in thin-plate moldability and hear resistance, the LCPs are preferable materials as the materials used for forming, for example, the lens holder 20, etc.

Either or both of the holding member (20) and the female screw (60) is/are formed using, for example, the composition including at least one or more injection-moldable thermoplastic heat-resistant synthetic resin materials selected from a group consisting of LCP, PPS, and PEEK. Depending on the design/specification of the optical member driving apparatus (1), either or both of the holding member (20) and the female screw (60) may be formed using, for example, the composition including at least one or more that injection-moldable thermoplastic heat-resistant synthetic resin materials selected from a group consisting of LCP and PPS. Depending on the design/specification of the optical member driving apparatus (1), either or both of the holding member (20) and the female screw (60) maybe formed using, for example, the composition including at least one or more injection-moldable thermoplastic heat-resistant synthetic resin materials selected from a group consisting of PPS and PEEK. Depending on the design/specification of the optical member driving apparatus (1), either or both of the holding member (20) and the female screw (60) may be formed using, for example, the composition including at least one or more injection-moldable thermoplastic heat-resistant synthetic resin materials selected from a group consisting of PEEK and LCP.

When the holding member 20 is formed using the injection-moldable thermoplastic heat-resistant synthetic resin material and the female screw 60 is formed using the injection-moldable thermoplastic heat-resistant synthetic resin material, the response characteristic of the optical member driving apparatus 1 is improved. The resin material has a smaller specific gravity than, that of, for example, a metal material, and is a material suitable for reduction of the weight. For example, while the specific gravity of iron is about 7.85 to 7.87, the specific gravity of PPS is about 1.35 to 1.42 and the specific gravity of PPS including a filler is about 1.56 to 2. For example, the specific gravity of PEEK is about 1.3 and the specific gravity of PEEK including a filler is about 1.4 to 1.55. For example, the specific gravity of LCP is about 1.27 to 1.4 and the specific gravity of LCP including a filler is about 1.55 to 1.95. If the holding member 20 and the female screw 60 are formed using the composition including the injection-moldable thermoplastic heat-resistant synthetic resin material, reduction of the weight of the holding member 20 and the female screw 60 is facilitated.

By forming the optical member 10 and the holding member 20 using the synthetic resin material, reduction of the weight of the holding member 20 including the optical member 10 is facilitated and, as a result, the holding member 20 including the optical member 10 becomes easily movable. If the holding member 20 including the optical member 10 having achieved light weight is supported by the supporting members 31, 32, the holding member 20 including the optical member 10 becomes easily movable on the supporting members 31, 32. If the holding member 20 is formed using the composition including the synthetic resin material, the sliding characteristic of the holding member 20 for the metal supporting members 31, 32 is improved. By reducing the weight of the holding member 20 including the optical member 10 and improving the sliding characteristic of the holding member 20, the response characteristic of the optical member driving apparatus 1 is improved.

By forming the female screw 60 using the synthetic resin material, reduction of the weight of the female screw 60 is facilitated and, as a result, the female screw 60 becomes easily movable. If the female screw 60 having achieved light weight is supported by the feed screw 70, the female screw 60 becomes easily movable on the feed screw 70. If the female screw 60 is formed using the composition including the synthetic resin material, the sliding characteristic of the female screw 60 for the metal feed screw 70 is improved. Since the female screw 60 is reduced in weight and improved in the sliding characteristic, the response characteristic of the optical member driving apparatus 1 is improved.

The components making up the optical member driving apparatus 1 such as the optical member 10, the holding member 20, and the female screw 60 are formed using the thermoplastic heat-resistant synthetic resin material excellent in injection-moldability based on the injection molding method excellent in mass-productivity. In the case where the components making up the optical member driving apparatus 1 such as the optical member 10, the holding member 20, and the female screw 60 are formed based on the injection molding method, even if each of these components is in a complicated shape, these components can be efficiently mass-produced.

The components making up the optical member driving apparatus 1 such as the optical member 10, the holding member 20, and the female screw 60 are formed using, for example, the composition including the injection-moldable thermoplastic heat-resistant synthetic resin material whose specific gravity is about 0.8 or greater and smaller than 2.2, specifically about 0.8 or greater and smaller than 2, and more specifically about 0.83 or greater and smaller than 1.98.

If the components making up the optical member driving apparatus 1 such as the optical member 10, the holding member 20, and the female screw 60 are formed using the composition including the injection-moldable thermoplastic heat-resistant synthetic resin material whose specific gravity is smaller than about 2.2, reduction of the weight of the optical member driving apparatus 1 is apt to be facilitated. More specifically describing, if the components making up the optical member driving apparatus 1 such as the optical member 10, the holding member 20, and the female screw 60 are formed using the composition including the injection-moldable thermoplastic heat-resistant synthetic resin material whose specific gravity is smaller than about 2, reduction of the weight of the optical member driving apparatus 1 is facilitated. By reducing the weight of each of the components such as the movable members including the optical member 10, the holding member 20, and the female screw 60, there is made up the optical member driving apparatus 1 having improved response characteristics.

By reducing the weight of each of the components such as the movable members including the optical member 10 and the holding member 20, when the holding member 20 including the optical member 10 is repeatedly and reciprocally driven at a high speed substantially in the longitudinal direction L of the supporting members 31, 32, there is reduced the load on the narrow-width substantially rectangular-flat-plate-shaped linking portion 53 of the substantially plate-spring-shaped flat plate portion 50a of the connecting member 50. By reducing the weight of each of the components such as the movable members including the optical member 10, the holding member 20, and the female screw 60, when the female screw 60 and the holding member 20 including the optical member 10 that are jointed by the connecting member 50 are repeatedly and reciprocally driven at a high speed substantially in the left or the right direction L (longitudinal direction L) or direction S (screw extending direction S), the load on the electric motor 100 is reduced.

In the case where the components such as the movable members including the optical member 10, the holding member 20, etc., are formed using, for example, the composition whose specific gravity is great and is about 2.2 or greater, the operation characteristic is degraded of the holding member 20 including the optical member 10 and the load is increased on the narrow-width substantially rectangular-flat-plate-shaped linking portion 53 of the substantially plate-spring-shaped flat plate portion 50a of the connecting member 50, and therefore, this is not preferable. When the components such as the movable members including the optical member 10, the holding member 20, the female screw 60, etc., are formed using, for example, the composition whose specific gravity is great and is about 2.2 or greater, the load is increased on the electric motor 100 and, therefore, this is not preferable.

More specifically describing, in the case where the components such as the movable members including the optical member 10, the holding member 20, etc., are formed using, for example, the composition whose specific gravity is great and is greater than about 2, the operation characteristic is degraded of the holding member 20 including the optical member 10 and the load is increased on the narrow-width substantially rectangular-flat-plate-shaped linking portion 53 of the substantially plate-spring-shaped flat plate portion 50a of the connecting member 50, and therefore, this is not preferable. When the components such as the movable members including the optical member 10, the holding member 20, the female screw 60, etc., are formed using, for example, the composition whose specific gravity is great and is greater than about 2, the load is increased on the electric motor 100, and therefore, this is not preferable. It is preferable that the specific gravity is small of the composition, from which the components such as the movable members including the optical member 10, the holding member 20, the female screw 60, etc. are formed.

The composition, which includes the injection-moldable thermoplastic heat-resistant synthetic resin material and whose specific gravity is in the vicinity of about 2, can be, for example, PPS having a large amount of fillers mixed therein. The PPS, which has a large amount of fillers and whose specific gravity is in the vicinity of about 2, can be, for example, Fortron (registered trademark) 6165A6, etc. by Polyplastics Co., Ltd., which is a linear PPS (linear-type PPS). The specific gravity of Fortron 6165A6 is about 1.98. The PPS including fillers whose specific gravity is in the vicinity of about 2 can be, for example, "DIC·PPS FZ-3600-L4", etc. by Dainippon Ink And Chemicals, Inc. which is a crosslinked-type PPS. The specific gravity of "DIC·PPS FZ-3600-L4" is about 2.

Of the injection-moldable thermoplastic heat-resistant synthetic resin materials, the specific gravity of the lightest synthetic resin material/composition is, for example, generally about 0.8. The injection-moldable thermoplastic heat-resistant synthetic resin material/composition whose specific gravity is in the vicinity of about 0.8 can be, for example, polymethylpentene that is excellent in transparency, heat resistance, etc. For example, the specific gravity of polymethylpentene is about 0.83 to 0.84. Polymethylpentene can be, for example, TPX (registered trademark) RT18, RT31, and DX820 by Mitsui Chemicals Inc. "TPX" is the abbreviation of "Transparent Polymer X".

For example, the specific gravity of TPX (registered trademark) RT18, RT31, and DX820 by Mitsui Chemicals Inc. is about 0.833. The transparency of TPX (registered trademark) RT18 by Mitsui Chemicals Inc. is about 94% according to a testing method based on "ASTM D 1746", for example. The transparency of TPX (registered trademark) RT31 and DX820 by Mitsui Chemicals Inc. is about 93% according to a testing method based on "ASTM D 1746", for example.

The forming materials of the supporting members 31, 32 and the feed screw 70 can be, for example, a "hot finish stainless steel bar" defined based on "JIS G 4304". The forming material of the supporting members 31, 32 and the feed screw 70 can be, for example, a "cold forming stainless steel bar" defined based on "JIS G 4318".

A specific stainless steel material can be austenite stainless steel (for example. SUS301), etc., which includes about 16 to 18 weight/mass % of chromium (Cr) and about 6 to 8 weight/mass % of nickel (Ni) and which has excellent processability. A specific stainless steel material can be austenite stainless steel (for example: SUS303), etc., which includes about 13 to 19 weight/mass % of chromium (Cr), a small amount of sulfur (S), and a small amount of phosphorus (P) and which has an excellent free-machining characteristic. A specific stainless steel material can be austenite stainless steel (for example: SUS304), etc., which includes about 18 to 20 weight/mass % of chromium (Cr) and about 8 to 10.5 weight/mass % of nickel (Ni) and which is non-magnetic steel and has an excellent corrosion resistance. Since austenite stainless steel is non-magnetic, when the supporting member 31, 32 and the feed screw 70 are formed using austenite stainless steel, for example, there is apt to be avoided adverse effects due to magnetism on the optical pickup apparatus, the optical disc apparatus, etc., for example. The above SUS304 is referred to as "chromium-nickel stainless steel", etc., since SUS304 includes chromium (Cr) and also nickel (Ni).

By making up the above lens driving apparatus 1 shown in FIGS. 1 and 2, for example, even if a stop instruction signal is sent to the stepping motor 100 of the stepping motor assembly 200, to abruptly stop the stepping motor 100, the vibration of the collimator lens 10 mounted on the lens holder 20 substantially ceases within a very short time period such as, for example, a time period longer than substantially zero msec and equal to or shorter than substantially 10 msec. Therefore, in the case where a laser beam is applied to any one of signal layers of a multilayer optical disc and, to form a beam spot on the one of the signal layers of the multilayer optical disc, even if inter-layer jumping of the beam spot is frequently executed, the spherical aberration correction of the laser beam spot formed by irradiation on each signal layer of the multilayer optical disc is promptly executed.

In the case where the stepping motor 100 of the motor assembly 200 is driven to be rotated and the lens holder 20 including the collimator lens 10 is moved substantially in the optical axis direction L/is stopped so that inter-layer jumping of the beam spot formed by irradiation on each signal layer of the multilayer optical disc has been executed, the fading and ceasing time of the vibration of the collimator lens 10 is ideally, for example, as close as substantially 0 msec in order to support a multilayer optical disc having software of a speedy game recorded thereon, for example. In the case where the stepping motor 100 of the motor assembly 200 is driven to be rotated and the lens holder 20 including the collimator lens 10 is moved substantially in the optical axis direction L/is stopped so that the inter-layer jumping of the beam spot formed by irradiation on each signal layer of the multilayer optical disc is executed, the fading and ceasing time of the vibration of the collimator lens 10 is within 10 msec. Thus, even if the inter-layer jumping of the beam spot is frequently executed, the playing of the speedy game is not interrupted and the speedy game is played smoothly.

By providing the above lens driving apparatus 1, etc., shown in FIGS. 1 and 2 in a housing not shown, the optical pickup apparatus not shown is made up.

By making up the optical pickup apparatus not shown including the above lens driving apparatus 1, there is realized an optical pickup apparatus capable of securely and promptly executing inter-layer jumping of a beam spot formed by irradiation on each signal layer of a multilayer optical disc. In the case where a laser beam is applied to any one of signal layers of a multilayer optical disc from the optical pickup apparatus, to form a beam spot on the one of the signal layers of the multilayer optical disc, even if inter-layer jumping of the beam spot is frequently executed, the spherical aberration correction of the laser beam spot formed by irradiation on each signal layer of the multilayer optical disc is apt to be promptly executed.

The lens driving apparatus 1 shown in FIGS. 1 and 2 and the optical pickup apparatus including the lens driving apparatus 1 are not provided with any alignment sensor (not shown) for the screw nut 60. Therefore, for example, when the optical disc apparatus including the optical pickup apparatus having the lens driving apparatus 1 is turned on, and the lens driving apparatus 1, the optical pickup apparatus, and the optical disc apparatus are energized and in their initial state, a synchronism loss correcting processing, an initial positioning processing, etc., are executed of the stepping motor 100 making up the motor assembly 200 of the lens driving apparatus 1. "Loss of synchronism" means, for example, a phenomenon in which a motor is not able to follow a pulse signal input into a motor driver (not shown).

Description will be given in detail for the state where the synchronism loss correcting processing, the initial positioning processing, etc., of the stepping motor 100 of the motor assembly 200 are executed. When the lens driving apparatus 1, the optical pickup apparatus, and the optical disc apparatus are energized and in their initial state, a current is passed through the stepping motor 100 to rotate the stepping motor 100, and with the motor being rotated, the lead screw 70 coupled to the stepping motor 100 is rotated.

Since the lead screw 70 is rotated, the screw nut 60 movably meshed with the lead screw 70 is moved toward the first side plate portion 91 that is on one end side of the bracket 90 fixed to the stepping motor 100, for example. The first side plate portion 56 that is on one end side of the covering portion 52 of the plate spring member 50 mounted on the screw nut 60 comes into contact with the first side plate portion 91 that is on the one end side of the bracket 90, and the rotation of the stepping motor 100 is stopped for a certain time period. Thus, the synchronism loss correcting processing, the initial positioning processing, etc., of the stepping motor 100 are executed.

Since the lead screw 70 is rotated, the screw nut 60 that is movably meshed with the lead screw 70 is moved toward the second side plate portion 92 that is on the other end side of the bracket 90 fixed to the stepping motor 100, for example. The second side plate portion 57 that is on the other end side of the covering portion 52 of the plate spring member 50 mounted on the screw nut 60 comes into contact with the second side plate portion 92 that is on the other end side of the bracket 90 and the rotation of the stepping motor 100 is stopped for a certain time period. Thus, the synchronism loss correcting processing, the initial positioning processing, etc., of the stepping motor 100 are executed.

In the lens driving apparatus 1 shown in FIGS. 1 and 2 and the optical pickup apparatus including the lens driving apparatus 1, alignment sensor for the screw nut 60 is not provided and omitted, and the lens driving apparatus 1 and the optical pickup apparatus including the lens driving apparatus 1 are reduced in number of parts and price. However, depending on the design/specification of the lens driving apparatus 1 and the optical pickup apparatus including the lens driving apparatus 1, for example, an alignment sensor not shown for the screw nut 60 may be provided in the lens driving apparatus 1 and the optical pickup apparatus having the lens driving apparatus 1.

The above lens driving apparatus 1 shown in FIGS. 1 and 2 and the like are provided in the housing not shown, to make up the pickup apparatus, and the optical pickup apparatus not shown is provided in the inside of a substantially rectangular-box-shaped housing, for example, a case (not shown), to make up the optical disc apparatus not shown.

The optical pickup apparatus not shown including the above lens driving apparatus 1 is made up, and thereafter, the optical disc apparatus not shown including the optical pickup apparatus not shown is made up. Thus, the optical disc apparatus is realized that is capable of securely and promptly executing the inter-layer jumping of the beam spot formed by irradiation on each signal layer of a multilayer optical disc. In the case where a light beam is applied to any one of the signal layers of the multilayer optical disc from the optical disc apparatus, to form a beam spot on the one of the signal layers of the multilayer optical disc, even if the inter-layer jumping of the beam spot is frequently executed, the spherical aberration correction of the beam spot formed by irradiation on each signal layer of the multilayer optical disc is apt to be promptly executed.

The above lens driving apparatus 1, the optical pickup apparatus including the above lens driving apparatus 1, and the optical disc apparatus including the above optical pickup apparatus can be used in a recoding and reproducing apparatus for recording data/information/signals, etc., in the above various types of optical discs and reproducing data/information/signals, etc., from the above various types of optical discs. The above lens driving apparatus 1, the optical pickup apparatus including the above lens driving apparatus 1, and the optical disc apparatus including the above optical pickup apparatus can be used in an apparatus for only reproducing use which reproduces data/information/signals, etc., from the above various types of optical disc.

The above lens driving apparatus 1, the optical pickup apparatus including the above lens driving apparatus 1, and the optical disc apparatus including the above optical pickup apparatus are provided for an optical disc apparatus which is incorporated into, for example, a computer, an audio/visual apparatus, a gaming machine, an on-vehicle apparatus (all not shown), etc. The above lens driving apparatus 1, the optical pickup apparatus including the above lens driving apparatus 1, and the optical disc apparatus including the above optical pickup apparatus can be provided for, for example, a computer such as a notebook personal computer (PC) a laptop PC, a desktop PC, or an on-vehicle computer, a gaming machine such as a computer gaming machine, and an audio and/or visual apparatus such as a CD player/CD recorder, or a DVD player/DVD recorder (all not shown). The above lens driving apparatus 1 and the optical pickup apparatus including the above lens driving apparatus 1 are compatible with a plurality of discs such as CD-type optical discs, DVD-type optical discs, "HD DVD"-type optical discs, and "Blu-ray Disc"-type optical discs. The above lens driving apparatus 1, and the optical pickup apparatus including the above lens driving apparatus 1 can be provided for a computer, an audio and/or visual apparatus, a gaming machine, an on-vehicle apparatus (all not shown), etc., that are compatible with various types of optical discs such as, for example, a "CD", a "DVD", an "HD DVD", a "Blu-ray Disc".

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical member driving apparatus comprising:
   a holding member configured to have an optical member mounted thereon;
   a driving unit assembly configured to be capable of driving the holding member;
   a connecting member configured to connect the holding member and the driving unit assembly, wherein the connecting member includes:
      a first mounting portion for the holding member;
      a second mounting portion for the driving unit assembly; and
      an intermediate portion connecting the first mounting portion and the second mounting portion; and
   a jointing member configured to join the connecting member and either or both of the holding member and the driving unit assembly, wherein a width of the intermediate portion is narrower than a width of the first mounting portion and a width of the second mounting portion.

2. The optical member driving apparatus of claim 1, wherein the driving unit assembly includes:
   an electric motor configured to generate a driving force;
   an electric motor configured to generate a driving force;
   a feed screw configured to transmit the driving force of the electric motor; and
   a female screw configured to be meshed with the feed screw, and wherein the connecting member is mounted on the female screw.

3. The optical member driving apparatus of claim 2, wherein
   the female screw is provided with an alignment portion configured to be aligned when the connecting member is mounted on the female screw, and wherein
   the connecting member is provided with a counterpart alignment portion corresponding to the alignment portion.

4. The optical member driving apparatus of claim 2, wherein
   the female screw is provided with an engaging portion configured to be engaged when the connecting member is mounted on the female screw, and wherein
   the connecting member is provided with an engagement lock portion corresponding to the engaging portion.

5. The optical member driving apparatus of claim 2, wherein
   the connecting member is formed with a covering portion by executing a folding processing for the connecting member in accordance with the female screw, and wherein
   the female screw is covered with the covering portion.

6. The optical member driving apparatus of claim 1, wherein
   the holding member is provided with a fixing portion corresponding to the connecting member, and wherein
   the connecting member is mounted on the fixing portion.

7. The optical member driving apparatus of claim 6, wherein
   the fixing portion is provided with an application facilitating portion configured to facilitate application of the jointing member to the fixing portion when fixing the connecting member to the fixing portion with the jointing member after mounting the connecting member on the fixing portion.

8. The optical member driving apparatus of claim 6, wherein
   the fixing portion is provided with the jointing member.

9. The optical member driving apparatus of claim 1, wherein
   a metal plate spring member is used as the connecting member.

10. The optical member driving apparatus of claim 1, wherein
    a polymeric adhesive is used as the jointing member.

* * * * *